United States Patent
Chen

(10) Patent No.: US 7,928,675 B2
(45) Date of Patent: Apr. 19, 2011

(54) FEEDBACK CONTROL METHOD AND APPARATUS FOR ELECTRIC MOTOR

(75) Inventor: Zhigian Chen, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 921 days.

(21) Appl. No.: 11/889,283

(22) Filed: Aug. 10, 2007

(65) Prior Publication Data
US 2008/0042606 A1 Feb. 21, 2008

(30) Foreign Application Priority Data
Aug. 17, 2006 (JP) .................... 2006-222240

(51) Int. Cl.
*H02P 21/14* (2006.01)

(52) U.S. Cl. .................. 318/400.02; 318/700

(58) Field of Classification Search .......... 318/700, 318/701, 714, 720, 724, 400.01, 400.02, 318/400.04, 430, 433, 434
See application file for complete search history.

(56) References Cited

U.S. PATENT DOCUMENTS

| | | | | |
|---|---|---|---|---|
| 6,320,349 B1 * | 11/2001 | Kaneko et al. | | 318/798 |
| 6,396,229 B1 * | 5/2002 | Sakamoto et al. | | 318/400.02 |
| 6,713,981 B2 * | 3/2004 | Nakajima | | 318/491 |
| 6,984,957 B2 * | 1/2006 | Tajima et al. | | 318/400.02 |
| 7,006,906 B2 * | 2/2006 | Kobayashi et al. | | 701/22 |
| 7,012,389 B2 * | 3/2006 | Kobayashi et al. | | 318/400.02 |
| 7,049,782 B2 | 5/2006 | Chen et al. | | |
| 7,064,504 B2 * | 6/2006 | Imai et al. | | 318/400.04 |
| 7,161,324 B1 * | 1/2007 | Satake et al. | | 318/720 |
| 2002/0011814 A1 * | 1/2002 | Nakajima | | 318/491 |
| 2007/0069681 A1 * | 3/2007 | Imura et al. | | 318/717 |
| 2009/0195197 A1 * | 8/2009 | Nishimura et al. | | 318/400.09 |
| 2010/0045218 A1 * | 2/2010 | Tomigashi | | 318/400.02 |
| 2010/0052581 A1 * | 3/2010 | Izumi et al. | | 318/400.04 |
| 2010/0090632 A1 * | 4/2010 | Maekawa | | 318/400.33 |
| 2010/0156333 A1 * | 6/2010 | Chen et al. | | 318/400.33 |

FOREIGN PATENT DOCUMENTS

| | | |
|---|---|---|
| JP | A-3-212182 | 9/1991 |
| JP | A-2002-315389 | 10/2002 |
| JP | A-2005-192341 | 7/2005 |
| JP | A-2006-014539 | 1/2006 |

* cited by examiner

*Primary Examiner* — Walter Benson
*Assistant Examiner* — Eduardo Colon-Santana
(74) *Attorney, Agent, or Firm* — Oliff & Berridge, PLC

(57) ABSTRACT

A feedback control method and apparatus for detecting phase currents of three or more phases on fixed coordinates of a polyphase electric motor with current sensors so as to be transformed into detection currents on rotating coordinates by fixed/rotating coordinate transformation and controlling the currents supplied to respective phases of the polyphase electric motor based on the detection currents on the rotating coordinates and target currents on the rotating coordinates.

45 Claims, 11 Drawing Sheets

F I G. 2
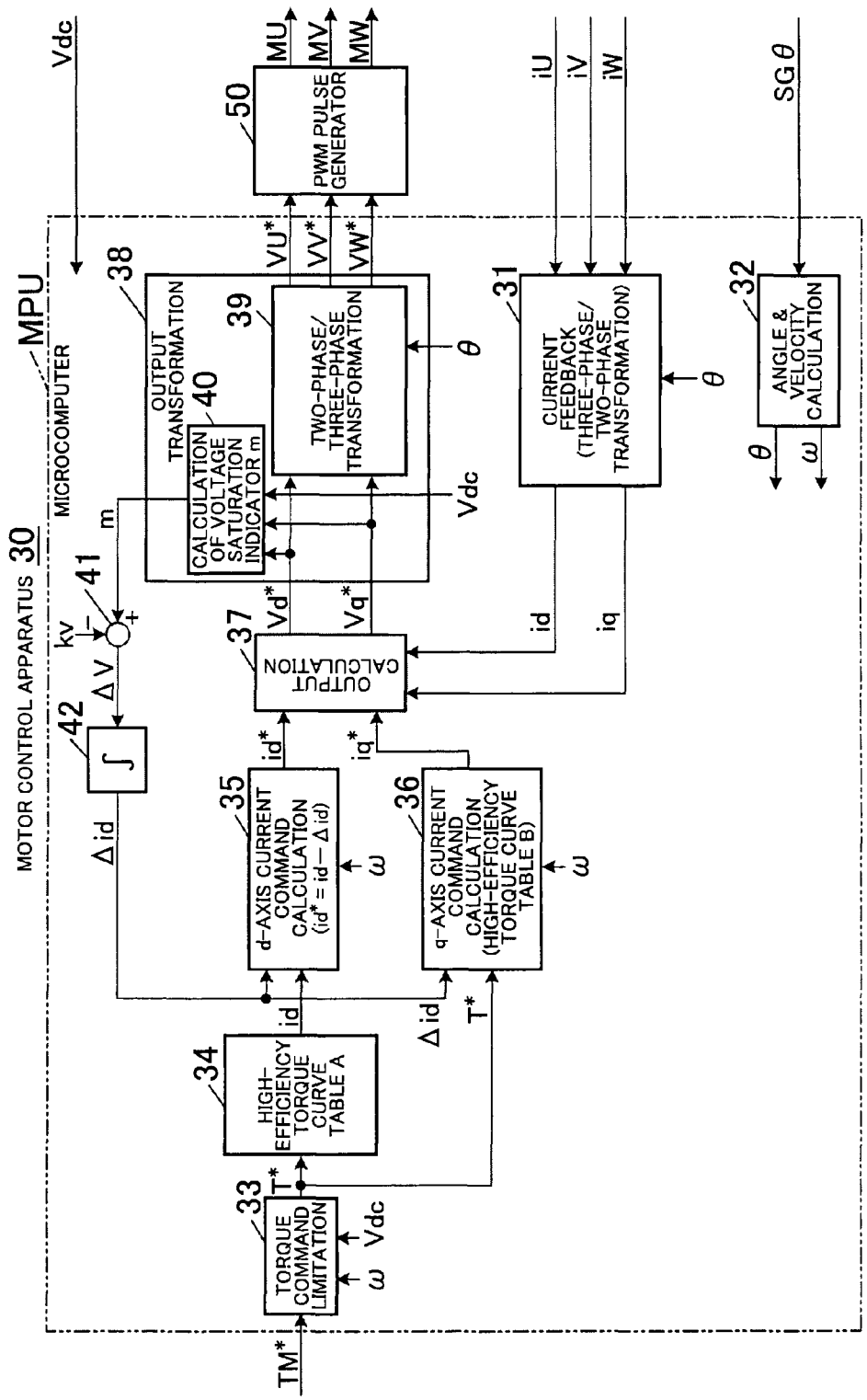

FIG. 5A

ODD-PHASE MOTOR CURRENT DETECTION
(THREE-PHASE CURRENT DETECTION WITH THREE-PHASE MOTOR)

| DETECTION PHASE | U | V | W |
|---|---|---|---|
| DETECTION TIMING | $-\Delta\theta p$ | 0 (REFERENCE) | $+\Delta\theta p$ |
| PHASE SHIFT FOR FIXED/ROTATION COORDINATE TRANSFORMATION | $+\Delta\theta p$ | 0 | $-\Delta\theta p$ |

FIG. 5B

ODD-PHASE MOTOR CURRENT DETECTION
(FIVE-PHASE CURRENT DETECTION WITH FIVE-PHASE MOTOR)

| DETECTION PHASE | t | u | v | w | x |
|---|---|---|---|---|---|
| DETECTION TIMING | $-\Delta 2\theta p$ | $-\Delta\theta p$ | 0 (REFERENCE) | $+\Delta\theta p$ | $+\Delta 2\theta p$ |
| PHASE SHIFT FOR FIXED/ROTATION COORDINATE TRANSFORMATION | $+\Delta 2\theta p$ | $+\Delta\theta p$ | 0 | $-\Delta\theta p$ | $-\Delta 2\theta p$ |

FIG. 9A

EVEN-PHASE MOTOR CURRENT DETECTION
(TWO-PHASE CURRENT DETECTION WITH THREE-PHASE MOTOR)

| DETECTION PHASE | U | V |
|---|---|---|
| DETECTION TIMING | $-\Delta\theta_p$ | 0 (REFERENCE) |
| PHASE SHIFT FOR FIXED/ROTATION COORDINATE TRANSFORMATION | 0 | $-\Delta\theta_p$ |

FIG. 9B

EVEN-PHASE MOTOR CURRENT DETECTION
(FOUR-PHASE CURRENT DETECTION WITH FIVE-PHASE MOTOR)

| DETECTION PHASE | t | u | v | w |
|---|---|---|---|---|
| DETECTION TIMING | $-\Delta 2\theta_p$ | $-\Delta\theta_p$ | 0 (REFERENCE) | $+\Delta\theta_p$ |
| PHASE SHIFT FOR FIXED/ROTATION COORDINATE TRANSFORMATION | $+\Delta\theta_p$ | 0 | $-\Delta\theta_p$ | $-\Delta 2\theta_p$ |

FEEDBACK CONTROL METHOD AND APPARATUS FOR ELECTRIC MOTOR

CROSS-REFERENCE TO RELATED APPLICATION

The disclosure of Japanese Patent Application No. 2006-222240 filed on Aug. 17, 2006 including the specification, drawings and abstract is incorporated herein by reference in its entirety.

BACKGROUND

The present invention relates to a feedback control method and apparatus for a polyphase electric motor.

There exists an electric motor that performs vehicle driving (traction) and vehicle braking (regeneration). By developing vector control technology, various kinds of electric motor control have become possible to be performed accurately and smoothly. Therefore, recently, using a polyphase alternating-current motor, such as a polyphase induction motor or a permanent magnet synchronous motor, for wheel drive motor control is performed using vector control technology. Japanese Patent Application Publication No. JP-A-2005-192341 discloses a permanent magnet synchronous motor mounted in a hybrid vehicle, and Japanese Patent Application Publication No. JP-A-2006-14539 discloses a vector control of this kind of motor.

For example, a three-phase permanent magnet synchronous motor is provided with a rotor equipped with a permanent magnet, and a stator equipped with stator coils of U-phase, V-phase, and W-phase. Japanese Patent Application Publication No. JP-A-2006-14539 describes a drive control apparatus for making the motor generate drive motor torque, which is torque of a drive motor, or generator torque, which is torque of a generator. The control apparatus sends pulse width modulation signals (PWM pulses) of U-phase, V-phase, and W-phase to an inverter. With the inverter supplying phase currents, namely U-phase, V-phase, and W-phase currents, to respective stator coils, the drive motor torque or the generator torque is generated.

SUMMARY

The drive control apparatus performs feedback control by a vector control calculation on a d-q axis (rotating coordinate) model, which uses a d-axis in the direction of a magnetic pole pair of the rotor, and a q-axis in the direction perpendicular to the d-axis. More specifically, the drive control apparatus detects electric currents supplied to respective stator coils, namely phase currents on fixed coordinates, a magnetic pole position of the rotor, and direct-current voltage (power supply voltage) at the entrance of the inverter, and performs three-phase/two-phase transformation, namely fixed/rotating coordinate transformation, from the detected three phase currents, namely three-phase currents on fixed coordinates, into d-axis current and q-axis current, namely currents on rotating coordinates, based on the magnetic pole position. On the other hand, referring to a torque/current conversion table on rotating coordinates, the drive control apparatus reads out a d-axis target current and a q-axis target current corresponding to a target torque, namely target currents on rotating coordinates, and calculates a deviation of d-axis transformed current from the d-axis target current and a deviation of q-axis transformed current from the q-axis target current, and calculates d-axis target voltage and q-axis target voltage for reducing each deviation to zero, and then performs two-phase/three-phase transformation, namely rotating/fixed coordinate transformation, from them into U-phase, V-phase, and W-phase voltage commands. The drive control apparatus generates PWM pulses based on each voltage command.

If a three-phase electric motor, for example, is feedback-controlled according to vector control theory, three-phase currents on fixed coordinates flowing through U-phase, V-phase, and W-phase coils are detected with current sensors, and transformed through three-phase (fixed coordinates)/two-phase (rotating coordinates) transformation into electric current values on rotating coordinates, for example in d- and q-axes, that is, into detection currents on rotating coordinates. On the other hand, a given target torque is converted to target currents on rotating coordinates, and, using the detection currents on the rotating coordinates and the target currents on the rotating coordinates, motor drive command values for making the former coincide with the latter are generated, and, based on the command values, currents to flow in U-phase, V-phase, and W-phase coils, or voltages applied to coils for flowing the currents, are controlled. Because the sum of instantaneous current values of each phase at the same point in time is zero in a three-phase electric motor using star-connected stator coils, in this case, by omitting detection of one phase current and detecting two of U-, V-, and W-phase currents, current values on rotating coordinates of three-phase/two-phase transformation, for example in d- and q-axes, can be calculated using both detected values. However, it is necessary to detect currents of at least two of the three phases on rotating coordinates.

Because a detected signal of a current sensor that detects phase current on fixed coordinates is an analog voltage (or an analog current), it is subjected to digital conversion (analog-digital [A/D] conversion) using an A/D conversion unit, for example, an A/D converter (single-functional device), a CPU, an MPU, or an application specific IC (ASIC). By simultaneously sampling and holding detected signals of all of the three phases or two of them, using multiple sample-and-hold circuits, and by sequentially performing digital conversion of multiple hold signals with one A/D conversion unit, digital data iU, iV, and iW of multiple detected signals at the same point in time are obtained as follows.

$$\left.\begin{aligned} iU &= \cos\theta \\ iV &= \cos(\theta - 2\pi/3) \\ iW &= \cos(\theta + 2\pi/3) \end{aligned}\right\} \quad (1)$$

In this case, rotating-coordinate transformed outputs id and iq can be obtained using data iU, iV, and iW (three-phase current data on fixed coordinates) and according to the following conventionally known three-phase/two-phase transformation (fixed/rotating coordinate transformation).

$$\begin{bmatrix} id \\ iq \end{bmatrix} = \sqrt{\frac{2}{3}} \begin{bmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \end{bmatrix} \begin{bmatrix} iU \\ iV \\ iW \end{bmatrix} \quad (2)$$

In the case of detecting only two of the three-phase currents on rotating coordinates, for example, iU and iV, rotating-coordinate transformed outputs id and iq can be obtained according to the following conventionally known three-phase/two-phase transformation.

$$\begin{bmatrix} id \\ iq \end{bmatrix} = \sqrt{2} \begin{bmatrix} \sin(\theta + \frac{\pi}{3}) & \sin\theta \\ \cos(\theta + \frac{\pi}{3}) & \cos\theta \end{bmatrix} \begin{bmatrix} iU \\ iV \end{bmatrix} \quad (3)$$

However, although only one A/D conversion unit is required to be provided, multiple sample-and-hold circuits are required, resulting in a higher cost by that much. If multiple A/D conversion units are provided, the cost increases by the increased number of A/D conversion units. By sequentially performing digital conversion of detected signals of multiple phases on fixed coordinates with one A/D conversion unit at time intervals of Δtp, detected data can be obtained at a low cost. In that case, however, since three-phase current detection data iU, iV, and iW, used as input values for the three-phase/two-phase transformation, are no longer the values at the same point in time (at the same pole position θ), they have a pole position difference Δθp corresponding to the time interval Δtp from each other, as follows.

$$\begin{aligned} iU &= \cos(\theta - \Delta\theta p) \\ iV &= \cos(\theta - 2\pi/3) \\ iW &= \cos(\theta + 2\pi/3 + \Delta\theta p) \end{aligned} \quad (4)$$

As a result, if conventionally known three-phase/two-phase transformation that is supplied as input values with three-phase currents iU, iV, and iW at the same pole position θ, for example the above equation (2) or (3), are used, calculation errors of rotating-coordinate transformed outputs id and iq are large in case of a large pole position difference Δθp, and thus, the accuracy of motor drive control that uses the outputs id and iq as feedback values is low.

In addition, current sensors have detection delays, and moreover, current detection data iU, iV, and iW are delayed from the pole position θ by a filter circuit or filter processing before digital conversion. For these reasons also, the current detection data iU, iV, and iW are shifted in timing (phase) from the pole position θ, resulting in a reduced accuracy in motor drive control.

The invention thus allows for improvement in the accuracy of feedback control of a polyphase electric motor, and at a low cost.

An exemplary aspect of the invention includes a feedback control method for detecting phase currents of three or more phases on fixed coordinates of a polyphase electric motor with current sensors so as to be transformed into detection currents on rotating coordinates by fixed/rotating coordinate transformation and controlling the currents supplied to respective phases of the polyphase electric motor based on the detection currents on the rotating coordinates and target currents on the rotating coordinates. The feedback control method includes performing digital conversion of odd-phase current detection signals that are output from the current sensors into phase current data sequentially at a time interval; and on a basis of a reference time point of digital conversion at a center of a sequence of the digital conversion, correcting a pole position of the phase current data whose digital conversion leads ahead of the reference time point into a value that is increased by the lead, correcting the pole position of the phase current data whose digital conversion lags behind the reference time point into a value that is reduced by the lag, and using corrected values for the fixed/rotating coordinate transformation.

An exemplary aspect of the invention includes a feedback control method for detecting three-phase currents on fixed coordinates of a three-phase electric motor with current sensors so as to be transformed into detection currents on rotating coordinates by fixed/rotating coordinate transformation and controlling the currents supplied to respective phases of the three-phase electric motor based on the detection currents on the rotating coordinates and target currents on the rotating coordinates. The feedback control method includes performing digital conversion of three-phase current detection signals that are output from the current sensors into phase current data sequentially at a time interval; and on a basis of a reference time point of digital conversion at a center of a sequence of the digital conversion, correcting a pole position of the phase current data whose digital conversion leads ahead of the reference time point into a value that is increased by the lead, correcting the pole position of the phase current data whose digital conversion lags behind the reference time point into a value that is reduced by the lag, and using corrected values for the fixed/rotating coordinate transformation.

An exemplary aspect of the invention includes a feedback control method for detecting phase currents of two or more phases on fixed coordinates of a polyphase electric motor with current sensors so as to be transformed into detection currents on rotating coordinates by fixed/rotating coordinate transformation and controlling the currents supplied to respective phases of the polyphase electric motor based on the detection currents on the rotating coordinates and target currents on the rotating coordinates. The feedback control method includes performing digital conversion of even-phase current detection signals that are output from the current sensors into phase current data sequentially at a time interval; and on a basis of a reference time point of the digital conversion immediately before or after a central point of a sequence of the digital conversion, by comparing either with the digital conversion immediately before the reference time point is at the central point or immediately after the reference time point is at the central point, correcting a pole position of the phase current data whose digital conversion leads ahead into a value that is increased by the lead, correcting the pole position of the phase current data whose digital conversion lags behind into a value that is reduced by the lag, and using corrected values for the fixed/rotating coordinate transformation.

An exemplary aspect of the invention includes a feedback control method for detecting two-phase currents on fixed coordinates of a three-phase electric motor with current sensors so as to be transformed into detection currents on rotating coordinates by fixed/rotating coordinate transformation and controlling the currents supplied to respective phases of the three-phase electric motor based on the detection currents on the rotating coordinates and target currents on the rotating coordinates. The feedback control method includes performing digital conversion of two-phase current detection signals that are output from the current sensors into phase current data at a time interval; and on a basis of a reference time point of the digital conversion immediately before or after a central point of a sequence of the digital conversion, correcting the pole position of the phase current data of the digital conversion at the reference time point into a value that is reduced by an amount corresponding to the time interval as the reference time point is immediately after the central point, correcting the pole position of the phase current data of the digital conversion at the reference time point into a value that is increased by an amount corresponding to the time interval as the reference time point is immediately before the central point, and using corrected values for the fixed/rotating coordinate transformation.

An exemplary aspect of the invention includes a feedback control apparatus that includes current sensors that detect phase currents of three or more phases on fixed coordinates of a polyphase electric motor; and a controller. The controller generates target currents on rotating coordinates of the polyphase electric motor; performs digital conversion of odd-phase current detection signals that are output from the current sensors into phase current data sequentially at a time interval; detects a pole position of the polyphase electric motor; on a basis of a reference time point of digital conversion at a center of a sequence of the digital conversion, corrects the pole position of the phase current data whose digital conversion leads ahead of the reference time point into a value that is increased by the lead, corrects the pole position of the phase current data whose digital conversion lags behind the reference time point into a value that is reduced by the lag, and, using corrected values, transforms the phase current data on the fixed coordinates into detection currents on rotating coordinates by fixed/rotating coordinate transformation; and controls the currents supplied to the respective phases of the polyphase electric motor, based on the detection currents on the rotating coordinates and the target currents.

An exemplary aspect of the invention includes a feedback control apparatus that includes current sensors that detect three-phase currents on fixed coordinates of a three-phase electric motor; and a controller. The controller generates target currents on rotating coordinates of the three-phase electric motor; performs digital conversion of three-phase current detection signals that are output from the current sensors into phase current data sequentially at a time interval; detects a pole position of the three-phase electric motor; on a basis of a reference time point of digital conversion at a center of a sequence of the digital conversion, corrects the pole position of the phase current data whose digital conversion leads ahead of the reference time point into a value that is increased by the lead, corrects the pole position of the phase current data whose digital conversion lags behind the reference time point into a value that is reduced by the lag, and, using corrected values, transforms the phase current data on the fixed coordinates into detection currents on rotating coordinates by fixed/rotating coordinate transformation; and controls the currents supplied to the respective phases of the three-phase electric motor, based on the detection currents on the rotating coordinates and the target currents.

An exemplary aspect of the invention includes a feedback control apparatus that includes current sensors that detect phase currents of two or more phases on fixed coordinates of a polyphase electric motor; and a controller. The controller generates target currents on rotating coordinates of the polyphase electric motor; performs digital conversion of even-phase current detection signals that are output from the current sensors into phase current data sequentially at a time interval; detects a pole position of the polyphase electric motor; on a basis of a reference time point of the digital conversion immediately before or after a central point of a sequence of the digital conversion, by comparing either with the digital conversion immediately before the reference time point is at the central point or immediately after the reference time point is at the central point, corrects the pole position of the phase current data whose digital conversion leads ahead into a value that is increased by the lead, corrects the pole position of the phase current data whose digital conversion lags behind into a value that is reduced by the lag, and, using corrected values, transforms the phase current data on the fixed coordinates into detection currents on rotating coordinates by fixed/rotating coordinate transformation; and controls the currents supplied to the respective phases of the polyphase electric motor, based on the detection currents on the rotating coordinates and the target currents.

An exemplary aspect of the invention includes a feedback control apparatus that includes current sensors that detect two-phase currents on fixed coordinates of a three-phase electric motor; and a controller. The controller generates target currents on rotating coordinates of the three-phase electric motor; performs digital conversion of two-phase current detection signals that are output from the current sensors into phase current data at a time interval; detects a pole position of the three-phase electric motor; on a basis of a reference time point of the digital conversion immediately before or after a central point of a sequence of the digital conversion, corrects the pole position of the phase current data of the digital conversion at the reference time point into a value that is reduced by an amount corresponding to the time interval as the reference time point is immediately after the central point, corrects the pole position of the phase current data of the digital conversion at the reference time point into a value that is increased by an amount corresponding to the time interval as the reference time point is immediately before the central point, and, using corrected values, transforms the phase current data on the fixed coordinates into detection currents on rotating coordinates by fixed/rotating coordinate transformation; and controls the currents supplied to the respective phases of the three-phase electric motor, based on the detection currents on the rotating coordinates and the target currents.

BRIEF DESCRIPTION OF THE DRAWINGS

Various exemplary aspect will be described with reference to the drawings, wherein:

FIG. 2 is a block diagram showing a schematic functional configuration of a motor control apparatus shown in FIG. 1;

FIG. 5A is a table showing the relationship between differences in timing to read currents for sequential digital conversion of three-phase currents iU, iV, and iW in this order according to a first embodiment and the amount of phase shift to correct phase differences between detection currents due to the timing difference, and FIG. 5B is a table showing the relationship between differences in timing to read currents of five-phase currents of a five-phase electric motor and the amount of phase shift to correct phase differences between detection currents due to the timing difference;

FIG. 9A is a table showing the relationship between differences in timing to read currents for sequential digital conversion of two-phase currents U and V out of three-phase currents iU, iV, and iW according to a second embodiment and the amount of phase shift to correct phase differences between detection currents due to the timing difference, and FIG. 9B is a table showing the relationship between differences in timing to read currents of five-phase currents of a five-phase electric motor and the amount of phase shift to correct phase differences between detection currents due to the timing difference;

DETAILED DESCRIPTION OF EMBODIMENTS

Other purposes and features of the present invention will become apparent from the following description of embodiments with reference to the accompanying drawings.

First Embodiment

Figure 1:
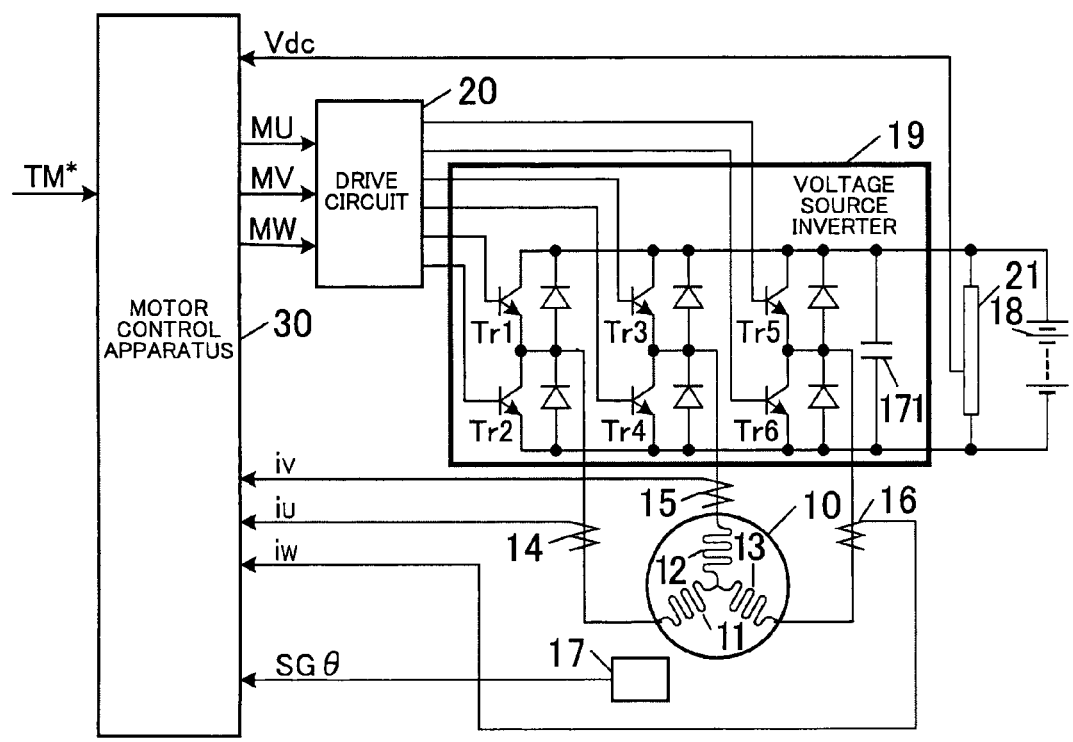
FIG. 1 is a block diagram showing the outline of a structure according to a first embodiment of the present invention.

FIG. 1 shows the outline of an embodiment of the present invention. An electric motor 10, which is a controlled object, is, in this embodiment, a permanent magnet synchronous motor mounted in a vehicle for driving the vehicle to run, and has a rotor including a built-in permanent magnet and a stator including three coils 1 to 13, of U-phase, V-phase, and W-phase. To the electric motor 10, a voltage source inverter 19 supplies the electric power of an in-vehicle battery 18. To the rotor of the electric motor 10, a rotor of a resolver 17 for detecting the pole position of the rotor is linked. The resolver 17 generates an analog voltage (rotational angle signal) SGθ representing the rotational angle of its rotor, and provides it to a motor control apparatus 30.

The voltage source inverter 19, which is provided with six switching transistors Tr1 to Tr6, by driving on (into conduction) the transistors Tr1 to Tr6 by means of each of six lines of drive signals that are generated in parallel by a drive circuit 20, converts the direct voltage of the battery 18 to three lines of alternating voltage, namely three-phase alternating voltages, with a phase difference of $2\pi/3$, and applies them to the respective three-phase (U-phase, V-phase, and W-phase) stator coils 11 to 13 of the electric motor 10. Thus, the currents iU, iV, and iW of each phase flow through the respective stator coils 11 to 13 of the electric motor 10, and the rotor of the electric motor 10 rotates. In order to increase the ability of power supply to the driving (switching) on and off of the transistors Tr1 to Tr6 by PWM pulses, and to suppress a voltage surge, the voltage source inverter 19 has a high-capacity capacitor 171 connected in parallel to the battery 18, which is the power supply.

The power lines connected to the stator coils 11 to 13 of the electric motor 10 are equipped with current sensors 14 to 16 that use hole ICs; each sensor detects each of the phase currents iU, iV, and iW, and generates a current detection signal (analog voltage), which is then provided to the motor control apparatus 30. A voltage sensor 21 provides a voltage detection signal Vdc representing the voltage of the in-vehicle battery 18, which is the motor driving power supply, to the motor control apparatus 30. The present embodiment uses a resistive voltage divider for the voltage sensor 21.

The motor control apparatus 30, which is in the present embodiment an electronic controller mainly composed of a microcomputer (hereinafter called "micom") MPU, includes, between the micom MPU and such devices as the drive circuit 20, the current sensors 14 to 16, the resolver 17, and the voltage sensor 21, an interface (signal processing circuit), which is not shown in the figure, and also, between the micom MPU and a main controller of a vehicle drive control system, which is not shown in the figure, in the vehicle, another interface (communication circuit), which is not shown in the figure.

FIG. 2 shows a schematic functional configuration of the motor control apparatus 30. An angle and velocity calculation 32 included in the micom MPU calculates the rotational angle (pole position) θ and the rotational velocity (angular velocity) ω of the rotor of the electric motor 10, based on the rotational angle signal SGθ given by the resolver 17, which is shown in FIG. 1.

Although, exactly speaking, the rotational angle of the rotor of the electric motor 10 and the pole position are not the same, there is a proportional relation between them, and the proportionality coefficient is determined by the number of poles p of the electric motor 10. Although, in addition, the rotational velocity and the angular velocity are not the same, there is a proportional relation also between them, and the proportionality coefficient is determined by the number of poles p of the electric motor 10. In this document, the rotational angle θ represents the pole position. Although the rotational velocity ω represents the angular velocity, the rotational velocity ω expressed in rpm represents the rotational velocity (rpm) of the rotor.

The micom MPU in the present embodiment performs feedback control by vector control calculation on a known d-q axis (rotating coordinate) model, which uses a d-axis in the direction of a magnetic pole pair of the rotor of the electric motor 10, and a q-axis in the direction perpendicular to the d-axis. Therefore, the micom MPU digitizes and reads in the signals of currents iU, iV, and iW detected by the current sensors 14 to 16, and in a current feedback 31, transforms the three-phase currents iU, iV, and iW into two-phase currents id and iq on the d-axis and q-axis, respectively, using three-phase/two-phase transformation, which is a known fixed/rotating coordinate transformation.

The main controller of the vehicle drive control system (not shown) provides a motor target torque TM* to the micom MPU of the motor control apparatus 30. The main controller calculates a required vehicle torque TO* based on the speed and the throttle opening of the vehicle, and corresponding to the required vehicle torque TO*, generates the motor target torque TM*, which is then provided to the micom MPU. The micom MPU outputs the rotational velocity co (rpm) of the electric motor 10 to the main controller.

A torque command limitation 33 of the micom MPU reads out the limit torque TM*max corresponding to the direct voltage Vdc and the rotational velocity ω from a limit torque table (lookup table), and, if the motor target torque TM* provided by the main controller exceeds TM*max, sets TM*max as a target torque T*, or, if it is TM*max or less, sets the motor target torque TM* provided by the main controller as a target torque T*. The target torque T*, which has been generated through this limitation, is provided to a first high-efficiency torque curve table A 34.

The limit torque table is a memory area in which values of the direct voltage Vdc and the rotational velocity ω in the ranges of the change of the voltage Vdc and the velocity ω, respectively, are used as addresses, and the maximum torque at which the electric motor 10 can generate at the values is written as a limit torque TM*max, and it means, in the present embodiment, a memory area of a RAM (not shown) in the micom MPU. The limit torque TM*max becomes large as the direct voltage Vdc becomes high, and becomes small as the direct voltage Vdc becomes low. In addition, the value of the limit torque TM*max becomes large as the rotational velocity c becomes low, and becomes small as the rotational velocity ω becomes high.

The micom MPU has a non-volatile memory in which the data TM*max of the limit torque table is written. In the process that an operating voltage is applied to the micom MPU and the micom MPU initializes itself in the motor drive system shown in FIG. 1, the micom MPU reads out the data in the non-volatile memory and writes it to the RAM. The micom MPU has more than one other similar lookup table, which, as will be mentioned later, also means a memory area in the RAM in which reference data stored in the non-volatile memory is written similarly to the limit torque table.

Written in the first high-efficiency torque curve table A 34, which is a lookup table, is a respective d-axis current value id, which is made correspond to the target torque T*, for generating each target torque T*.

Figure 6:
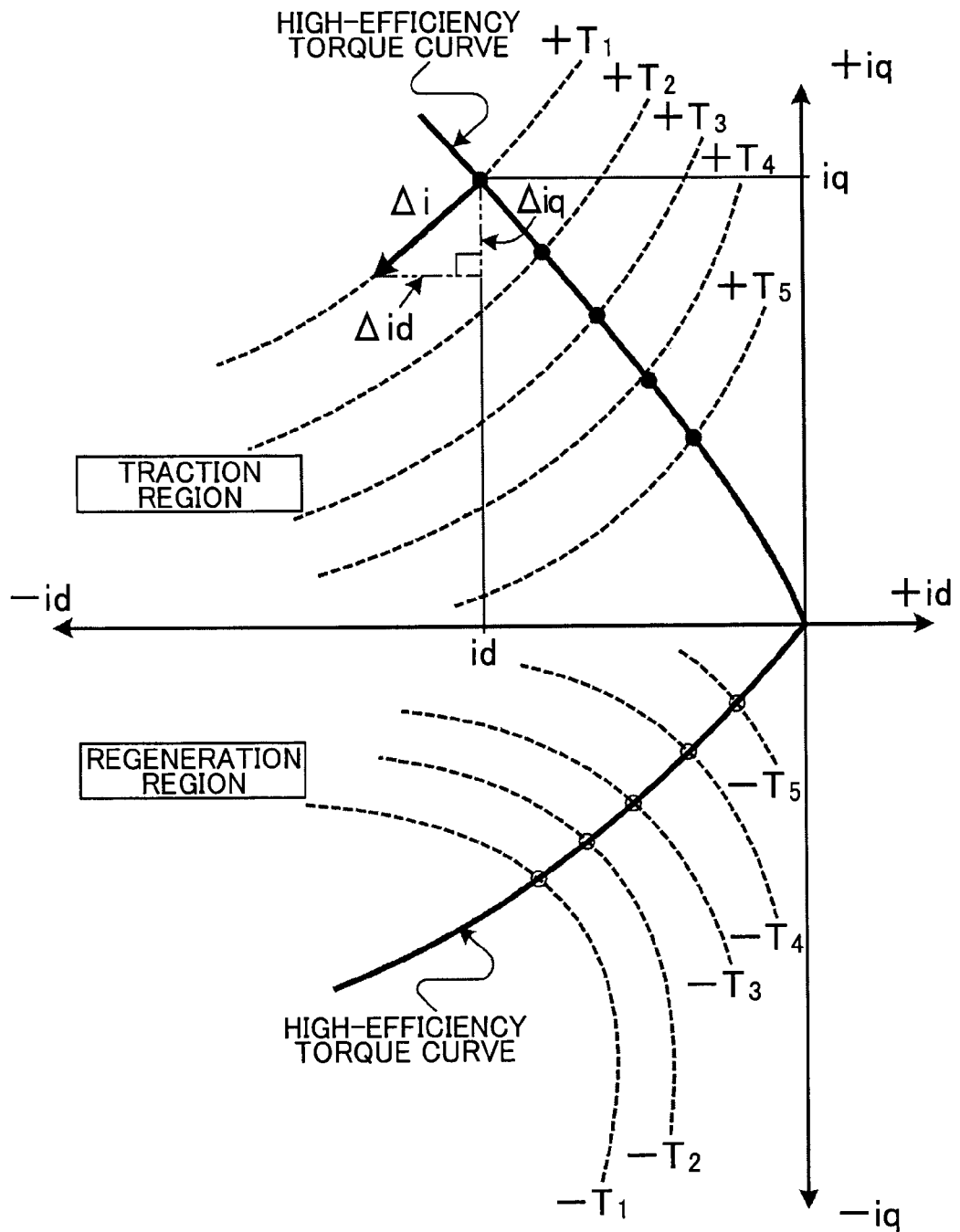
FIG. 6 is a graph whose horizontal axis represents d-axis currents and whose vertical axis represents q-axis currents, schematically showing a high-efficiency torque curve of an electric motor shown in FIG. 1.

Here, refer to FIG. 6, which shows a high-efficiency torque curve. Although an output torque of an electric motor is determined corresponding to values of the d-axis current id and the q-axis current iq, as shown by dotted-line curves in FIG. 6, there are infinite number of combinations of id and iq to output the same torque with respect to one rotational velocity value, that is, at the same rotational velocity of the motor. The dotted-line curves are constant torque curves. A combination of id and iq that provides the highest power usage effectiveness (the lowest power consumption) exists at the point, which is a high-efficiency torque point, on each torque curve. The curve (a thick solid-line curve in FIG. 6) that connects the high-efficiency torque points on the multiple torque curves is a high-efficiency torque curve, which exists for each rotational velocity. By energizing the electric motor 10 in accordance with the target currents of the d-axis current id and the q-axis current iq at the point of a given motor target torque TM* on the high-efficiency torque curve for the rotational velocity of the motor, the electric motor 10 outputs the target torque T*, and moreover, the power usage effectiveness of motor energization is high.

In the present embodiment, the high-efficiency torque curve is divided into two kinds: the first high-efficiency torque curve A, which represents the d-axis values, and a second high-efficiency torque curve B, which represents the q-axis values. In addition, the first high-efficiency torque curve A forms a pair of the curve that is applied to the traction region and the curve that is applied to the regeneration region, both of which represent the d-axis target current with respect to the rotational velocity and target torque of the motor.

The first high-efficiency torque curve table A 34 is a memory area in which is written the d-axis target current, which corresponds to the target torque T*, to generate the target torque with the lowest power consumption. The table is composed of a pair of a traction table A1 for traction and a regeneration table A2 for regeneration. Whether traction or regeneration is judged based on the rotational velocity ω and the target torque T* of the electric motor, and according to the judgment result, it is determined which of the traction table or the regeneration table is to be used:

the first quadrant, in which the rotational velocity ω has a positive value and the target torque T* has a positive value, is a traction region, the second quadrant, in which the rotational velocity c has a negative value and the target torque T* has a positive value, is a regeneration region, the third quadrant, in which the rotational velocity ω has a negative value and the target torque T* has a negative value, is a traction region, and the fourth quadrant, in which the rotational velocity ω has a positive value and the target torque T* has a negative value, is a regeneration region.

However, since the back electromotive force generated in the stator coils 11 to 13 increases as the rotational velocity ω of the electric motor 10 rises, the terminal voltages of the coils 11 to 13 rise. Along with this, as it becomes difficult to supply the target currents from the inverter 19 to the coils 11 to 13, the target torque output becomes unable to be obtained. In this case, by reducing the d-axis current id and the q-axis current iq by Δid and Δiq, respectively, along the constant torque curve (for example, the dotted-line curve +T1 in FIG. 6) for a given motor target torque TM*, the target torque T* can be output, though the power usage effectiveness drops. This is called field weakening control. The d-axis field weakening current Δid is generated by a field adjustment calculation 42, and provided to a d-axis current command calculation 35 and a q-axis current command calculation 36. The calculation of the d-axis field weakening current Δid is described later.

Then the d-axis current command calculation 35 in FIG. 2 calculates the d-axis target current id* by subtracting the d-axis field weakening current Δid from the d-axis current id, which is read out, corresponding to the target torque T* output from the torque command limitation 33, from the first high-efficiency torque curve table A 34, and provides the d-axis target current id* to an output calculation 37:

$$id^* = id - \Delta id \quad (20).$$

The q-axis current command calculation 36 in FIG. 2 is provided with a second high-efficiency torque curve table B. This table contains the data of the corrected second high-efficiency torque curve B, which has been corrected, from the second high-efficiency torque curve B that represents the q-axis values of the high-efficiency torque curve (for example, FIG. 6), to the curve that represents the q-axis target currents, which is obtained by subtracting the q-axis field weakening current Δiq, which is the counterpart of the d-axis field weakening current Δid.

The second high-efficiency torque curve table B is a memory area in which is written the d-axis target current, namely the target current value of the corrected second high-efficiency torque curve B, which corresponds to the target torque T* and the d-axis field weakening current Δid, to generate the target torque with the lowest power consumption. This table is composed of a pair of a traction table B1 for traction and a regeneration table B2 for regeneration. Whether traction or regeneration is judged based on the rotational velocity ω and the target torque T* of the electric motor, and according to the judgment result, it is determined which of the traction table or the regeneration table is to be used.

The q-axis current command calculation 36 reads out the q-axis target current iq*, which corresponds to the target torque T* and the d-axis field weakening current Δid, from the second high-efficiency torque curve table B, and provides the current to the output calculation 37.

To the output calculation 37 shown in FIG. 2, the above-mentioned d-axis and q-axis target currents id* and iq* are provided. The output calculation 37 calculates a current deviation δid between the d-axis target current id* and the d-axis current id, and a current deviation δiq between the q-axis target current iq* and the q-axis current iq, and based on each current deviation of δid and δiq, performs proportional control and integral control (PI calculation of feedback control). In other words, based on the current deviation δid, the output calculation 37 calculates a voltage drop Vzdp, which represents the voltage command value of the proportional component, and a voltage drop Vzdi, which represents the voltage command value of the integral component, and by adding the voltage drops Vzdp and Vzdi, calculates a voltage drop Vzd as:

$$Vzd = Vzdp + Vzdi \qquad (21).$$

In addition, the output calculation 37 reads in the rotational velocity ω and the q-axis current iq, and based on the rotational velocity ω, the q-axis current iq, and a q-axis inductance Lq, calculates an induced voltage ed induced by the q-axis current iq as follows:

$$ed = \omega \cdot Lq \cdot iq \qquad (22)$$

and, by subtracting the induced voltage ed from the voltage drop Vzd, calculates a d-axis voltage command value vd* as an output voltage, as follows:

$$vd^* = Vzd - ed \qquad (23)$$
$$= Vzd - \omega \cdot Lq \cdot iq.$$

Moreover, the output calculation 37, calculating based on the current deviation δiq a voltage drop Vzqp representing the voltage command value of the proportional component and a voltage drop Vzqi representing the voltage command value of the integral term, and then adding the voltage drops Vzqp and Vzqi, calculates a voltage drop Vzq as:

$$Vzq = Vzqp + Vzqi.$$

Furthermore, based on the rotational velocity co, a back electromotive voltage constant MIf, the d-axis current id, and an inductance Ld on the d-axis, the output calculation 37 calculates an induced voltage eq induced by the d-axis current id as follows:

$$eq = \omega(MIf + Ld \cdot id) \qquad (24)$$

and, by adding the induced voltage eq to the voltage drop Vzq, calculates a q-axis voltage command value vq* as an output voltage, as follows:

$$vq^* = Vzq + eq \qquad (25)$$
$$= Vzq + \omega(MIf + Ld \cdot id).$$

A two-phase/three-phase transformation 39 in an output transformation 38 transforms the two-phase target voltages Vd* and Vq* output by the output calculation 37 into three-phase target voltages VU*, VV*, and VW* according to the known two-phase/three-phase transformation, and sends them to a PWM pulse generator 50. The PWM pulse generator 50 converts the three-phase target voltages VU*, VV*, and VW* to PWM pulses MU, MV, and MW to output the voltages of their values, and outputs them to the drive circuit 20 shown in FIG. 1. The drive circuit 20, generating six lines of driving signals in parallel based on the PWM pulses MU, MV, and MW, switches on and off each of the transistors Tr1 to Tr6 of the voltage source inverter 19, using the driving signal in each line. By this, VU*, VV*, and VW* are applied to the respective stator coils 11 to 13 of the electric motor 10, and the phase currents iU, iV, and iW flow.

Referring again to FIG. 2, the output transformation 38, by its internal functional block 40, calculates a voltage saturation indicator m, which is a parameter for field weakening control. In other words, based on the d-axis voltage command value vd* and the q-axis voltage command value vq*, the output transformation 38 calculates, as a value representing a degree of voltage saturation, the voltage saturation indicator m as follows:

$$m = \sqrt{(vd^{*2} + vq^{*2})}/Vdc \qquad (26)$$

and sends it to a subtractor 41. Assuming a threshold value representing the maximum output voltage of the inverter 19 as a comparison value Vmax given by:

$$V\text{max} = k \cdot Vdc \qquad (27)$$

the subtractor 41 subtracts the constant kv (0.78 in the present embodiment) from the voltage saturation indicator m to obtain a calculated value of voltage saturation ΔV as:

$$\Delta V = m - kv \qquad (28)$$

and sends it to the field adjustment calculation 42.

The field adjustment calculation 42 integrates ΔV, and, if the integrated value ΣΔV takes a positive value, calculates the d-axis field weakening current Δid for performing field weakening control, by multiplying the integrated value ΣΔV by a proportionality constant, and sets it to a positive value; if the calculated value of voltage saturation ΔV or the integrated value ΣΔV takes a zero or negative value, the field adjustment calculation 42 renders the adjustment value Δid and the integrated value ΣΔV zero. The adjustment value Δid is provided to the d-axis current command calculation 35 and the q-axis current command calculation 36.

The micom MPU shown in FIG. 2 is provided, along with a CPU, with a RAM, ROM, and flash memory, which are used to record data and various programs. The micom MPU writes a program, reference data, and lookup tables contained in the ROM or flash memory into the RAM, and performs, based on the program, the input processing, calculation, and output processing, which are shown in the block enclosed by two-dot chain lines in FIG. 2.

Figure 3:
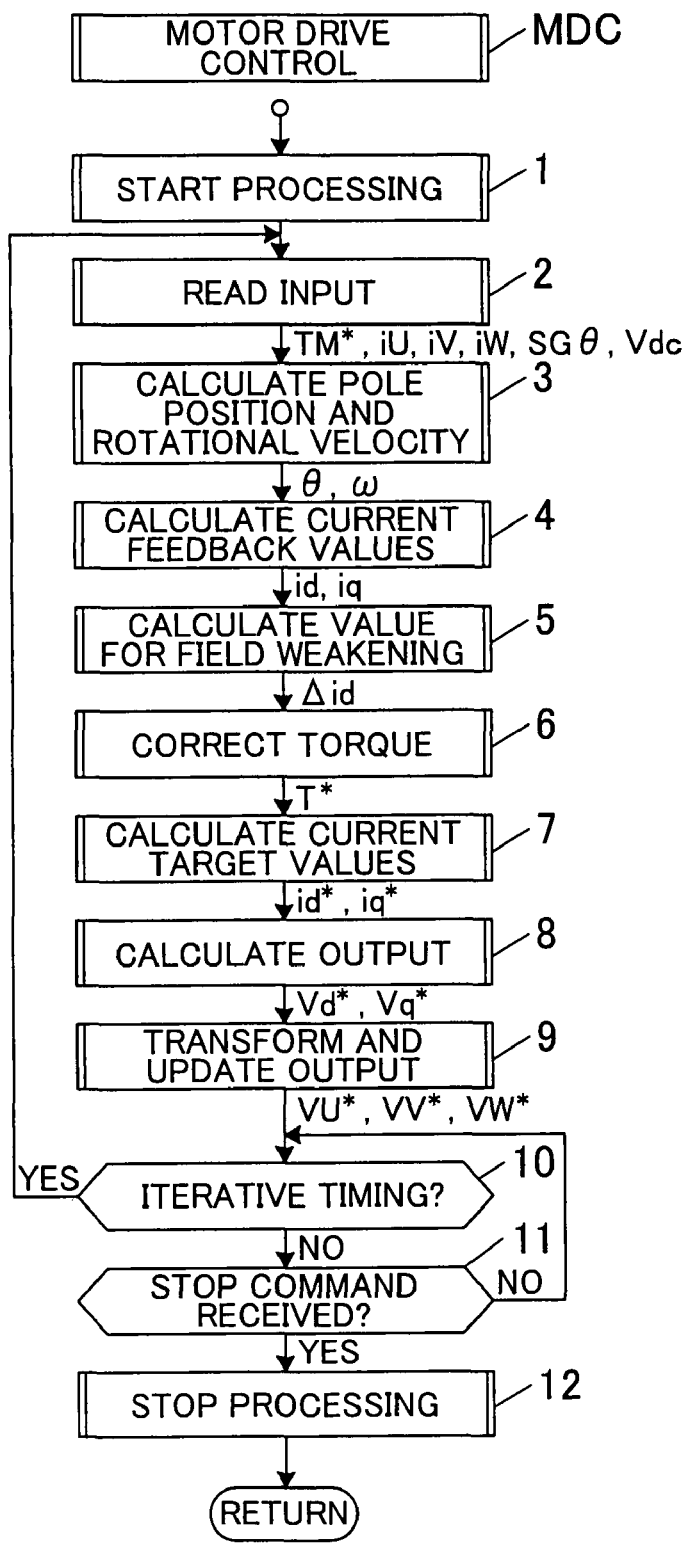
FIG. 3 is a flowchart schematically showing motor drive control by means of a microcomputer shown in FIG. 2.

FIG. 3 shows the outline of a motor drive control MDC, which (the CPU of) the micom MPU performs based on the program. When an operating voltage is applied, the micom MPU initializes itself and the motor drive system shown in FIG. 1, and sets itself to the static standby state. Then the micom MPU waits for a motor drive start command from the main controller of the vehicle drive control system (not shown). When the motor drive start command is provided, the micom MPU sets, by "start processing" (step 1) (note that hereinafter the word "step" is omitted and simply a number is noted in parentheses), the motor drive system to a state in which the motor drive control MDC can be executed, and reads input signals or data in "read input" (2).

Figure 4A:
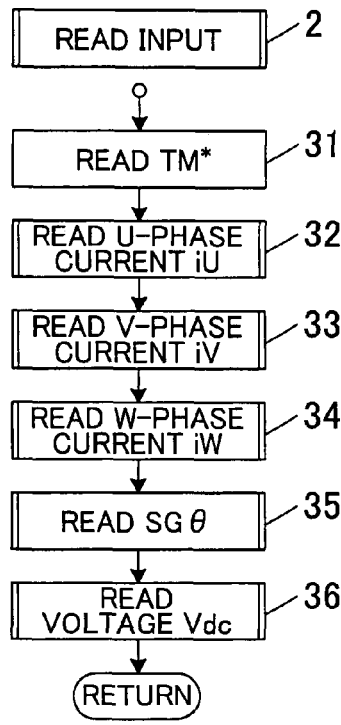
FIG. 4A is a flowchart showing the content of "read input" shown in FIG. 3.
Figure 7:
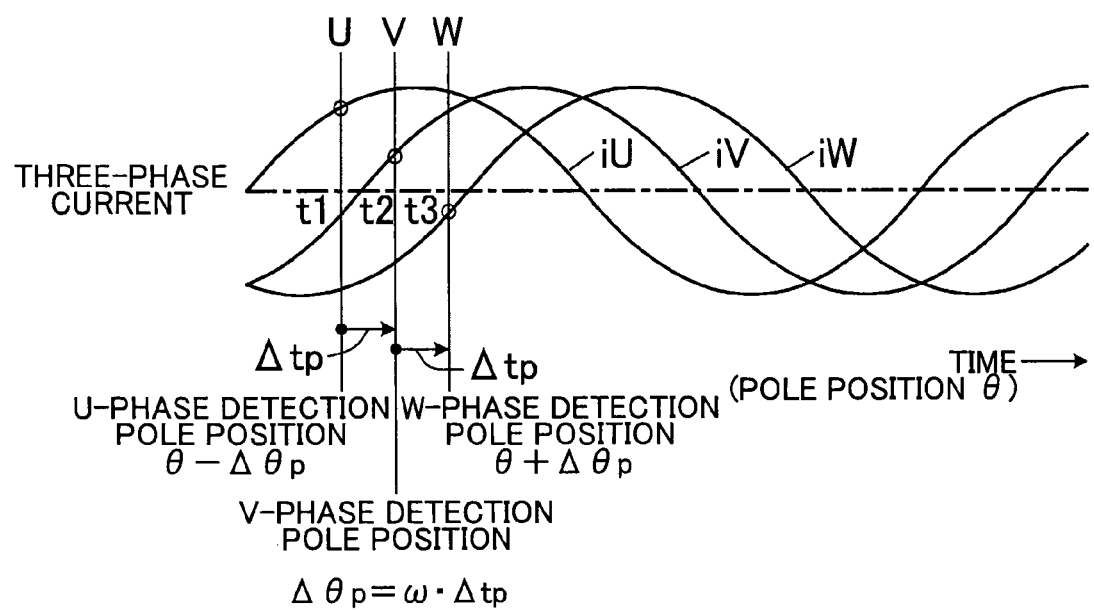
FIG. 7 is a timing chart showing three-phase current waveforms.

FIG. 4A shows the content of "read input" (2). In "read input" (2), the micom MPU reads in the motor target torque TM*(31), which the main controller provides, and reads in the current detection signals iU, iV, and iW, in this order at time intervals of Δtp, through respective digital conversion (32, 33, and 34), and in addition, reads in the rotational angle signal SGθ and the power supply voltage signal Vdc through respective digital conversion (35 and 36). By reading in the current detection signals iU, iV, and iW, in this order at time intervals of Δtp, through respective digital conversion, the times of the digital conversion that reads the current detection signals iU, iV, and iW for each phase become, as shown in FIG. 7, t1, t2, and t3 with a time difference of t3−t2=t2−t1=Δtp. Using the rotational velocity ω at this time, a pole position difference Δθp for the time difference is given as:

$$\Delta\theta p = \omega \cdot \Delta tp \qquad (29).$$

Refer again to FIG. 3. After finishing "read input" (2), the micom MPU calculates the rotational angle θ and the rotational velocity ω, based on the rotational angle signal SGθ (rotational angle data SGθ) that has been read (3). This function is shown as the angle and velocity calculation 32 in FIG. 2. Next, the micom MPU transforms the three-phase current detection signals iU, iV, and iW that have been read, into the two-phase d-axis current id and q-axis current iq, by three-phase/two-phase transformation (4). This function is shown as the current feedback 31 in FIG. 2.

Figure 4B:
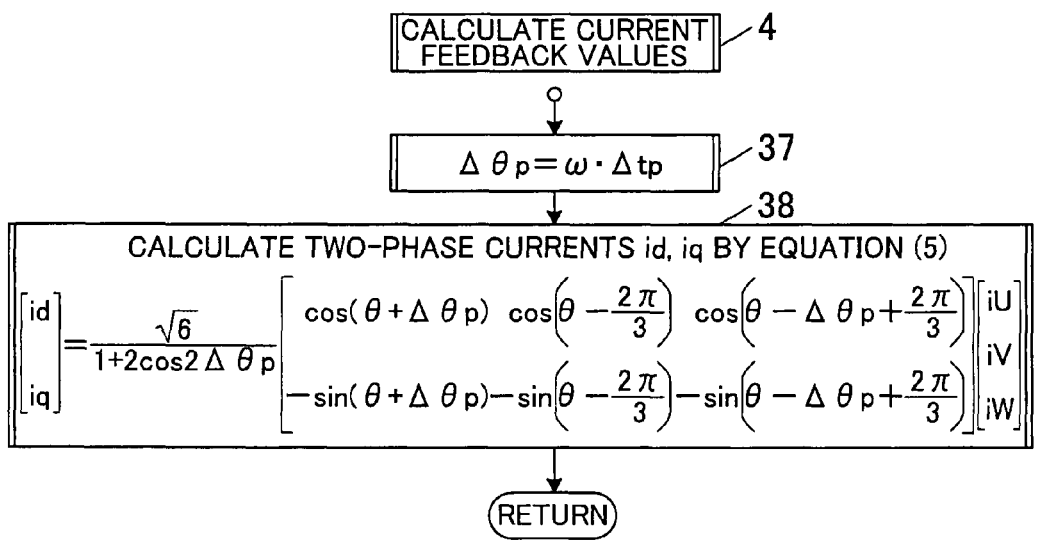
FIG. 4B is a flowchart showing the content of "calculate current feedback values" shown in FIG. 3.

FIG. 4B shows the content of "calculate current feedback values" (4). Here, using the interval Δtp of reading of the current detection signals iU, iV, and iW through digital conversion and the rotational velocity ω, which has been calculated in step 3, the micom MPU calculates the amount of pole position change Δθp=ω·Δtp, corresponding to the interval Δtp (37). Then, the micom MPU calculates the two-phase currents, that is, the d-axis current id and the q-axis current iq, by the three-phase/two-phase transformation, which is substituted into the equation (5) the current detection data iU, iV, and iW of each phase, the pole position θ calculated in step 3, and the amount of pole position change Δθp (38).

In order to increase the accuracy of the three-phase/two-phase transformation, the amplitude Ka of currents id and iq, which are calculated in the equation (5), on the rotating coordinates, is rendered to be a value corresponding to the amount of pole position change Δθp as shown in the equation (5), which is given by:

$$Ka = (\sqrt{6})/(1+2\cos 2\Delta\theta p) \quad (12).$$

The reason for this is described as follows. When the currents id and iq on the rotating coordinates are ($\sqrt{2/3}$) and 0, as the equation (7) shows, in the case that the amount of pole position change Δθp is 0, the three-phase currents iU, iV, and iW on the fixed coordinates are represented by the equation (8).

$$\begin{bmatrix} id \\ iq \end{bmatrix} = \begin{bmatrix} \sqrt{\frac{2}{3}} \\ 0 \end{bmatrix} \quad (7)$$

$$\begin{bmatrix} iU \\ iV \\ iW \end{bmatrix} = \begin{bmatrix} \cos\theta \\ \cos\left(\theta - \frac{2\pi}{3}\right) \\ \cos\left(\theta + \frac{2\pi}{3}\right) \end{bmatrix} \quad (8)$$

If the above-mentioned pole position change Δθp is not null, the three-phase currents iU, iV, and iW are represented by the equation (9).

$$\begin{bmatrix} iU \\ iV \\ iW \end{bmatrix} = \begin{bmatrix} \cos(\theta - \Delta\theta p) \\ \cos\left(\theta - \frac{2\pi}{3}\right) \\ \cos\left(\theta + \frac{2\pi}{3} + \Delta\theta p\right) \end{bmatrix} \quad (9)$$

The three-phase/two-phase transformation equation in this case, with Ka denoting the amplitude of the currents id and iq on the rotating coordinates, is given by the equation (10).

$$\begin{bmatrix} id \\ iq \end{bmatrix} = Ka \cdot \begin{bmatrix} \cos(\theta + \Delta\theta p) & \cos\left(\theta - \frac{2\pi}{3}\right) & \cos\left(\theta - \Delta\theta p + \frac{2\pi}{3}\right) \\ -\sin(\theta + \Delta\theta p) & -\sin\left(\theta - \frac{2\pi}{3}\right) & -\sin\left(\theta - \Delta\theta p + \frac{2\pi}{3}\right) \end{bmatrix} \begin{bmatrix} iU \\ iV \\ iW \end{bmatrix} \quad (10)$$

By following this equation (10), and equating the calculated values to the values from the equation (7) as in the case that the amount of pole position change Δθp is 0, the equation (11) is obtained. Calculating the amplitude Ka from the equation (11) leads to the equation (12).

$$\begin{bmatrix} id \\ iq \end{bmatrix} = Ka \cdot \begin{bmatrix} \frac{1 + 2\cos 2\theta}{2} \\ 0 \end{bmatrix} = \begin{bmatrix} \sqrt{\frac{3}{2}} \\ 0 \end{bmatrix} \quad (11)$$

$$Ka = \frac{\sqrt{6}}{1 + 2\cos 2\Delta\theta p} \quad (12)$$

In other words, the amplitude Ka must be rendered to be ($\sqrt{6}$)/(1+2 cos 2Δθp). By doing this, the current values id and iq on the rotating coordinates can be obtained exactly, even if the amount of pole position change Δθp is not null.

Refer again to FIG. 3. After calculating the d-axis current id and the q-axis current iq, the micom MPU, referring to the integrated value ΣΔV, calculates the adjustment value Δid for performing field weakening control by multiplying the integrated value ΣΔV by a proportionality constant (5). This function is shown as the field adjustment calculation 42 in FIG. 2. Next, the micom MPU reads out from the limit torque table the limit torque TM*max, which corresponds to the read-in motor target torque TM*, the read-in direct voltage Vdc, and the calculated rotational velocity ω, and, if the read-in motor target torque TM* exceeds TM*max, sets TM*max as a target torque T*, or, if it is TM*max or less, sets the read-in motor target torque TM* as a target torque T* (6). This function is shown as the torque command limitation 33 in FIG. 2.

In next "calculate current target values" (7), the micom MPU reads out the d-axis current value id, which is made correspond to the above target torque T*, from the first high-efficiency torque curve table A. Then, using Δid calculated in "calculate value for field weakening" (5) and the read-out d-axis current value id, the micom MPU calculates the d-axis target current id* as:

$$id^* = id - \Delta id \quad (20).$$

Next, the micom MPU reads out the q-axis current value iq, which is made to correspond to the above target torque T* and the d-axis field weakening current Δid, from the second high-efficiency torque curve table B. Then the process advances to the next "calculate output" (8) shown in FIG. 3. The processing function of the above-mentioned "calculate current target values" (7) is shown in FIG. 2 as the d-axis current command calculation 35 and the q-axis current command calculation 36.

Refer again to FIG. 3. Next to "calculate current target values" (7), the micom MPU converts the deviations δid and δiq of the feedback currents id and iq, which have been calculated in step 4, from the d-axis and q-axis target currents id* and iq*, to the d-axis and q-axis target voltages Vd* and Vq* (8). Next, the micom MPU transforms the d-axis and q-axis target voltages Vd* and Vq* into the three-phase voltages VU*, VV*, and VW*, and updates with them the output to the PWM pulse generator 50. After updating the output, the micom MPU calculates the voltage saturation indicator m, which is used for field weakening control, based on the thus obtained d-axis and q-axis target currents id* and iq*, and the power supply voltage Vdc, and then, by calculating the value of voltage saturation $\Delta V$ and integrating $\Delta V$ into the integrated value $\Sigma \Delta V$, calculates the d-axis field weakening current $\Delta id$ for next field weakening control, based on the obtained integrated value $\Sigma \Delta V$. The calculated d-axis field weakening current $\Delta id$ is used for the next "calculate current target values" (7). These processing functions of "calculate output" (8) and "transform and update output" (9) are shown in FIG. 2 as the output calculation 37, the output transformation 38, a subtractor 41, and the field adjustment calculation 42.

Referring again to FIG. 3, after updating the output to the PWM pulse generator 50 with the thus calculated three-phase voltages VU*, VV*, and VW*, the micom MPU waits for the next iterative processing timing (10). Then the process advances to "read input" (2) again. The micom MPU executes the above-mentioned "read input" (2) and the later processing. When receiving a stop command from the system controller (11) while waiting for the next timing of the iterative processing, the micom MPU stops its output for energizing the motor rotation (12).

The above-mentioned first embodiment performs digital conversion from the three-phase (odd-phase) currents on the fixed coordinates of the three-phase electric motor, which is a polyphase electric motor, to phase-current data sequentially at intervals of $\Delta tp$, and transforms them into detection currents id and iq on the rotating coordinates by the fixed/rotating coordinate transformation represented by the below equation (5). This sequential digital conversion is performed in the order of U, V, and W phase. As shown in FIG. 5A, on the basis of the reference time point (required amount of phase shift is 0) of the V-phase digital conversion, which occurs at the center of the sequence of the digital conversion, the pole position $\theta$ of the U-phase current data, whose digital conversion leads ahead of the reference time point, is corrected into the value of $\theta + \Delta\theta p$, which is increased by $\Delta\theta p$ corresponding to the lead; the pole position $\theta$ of the W-phase current data, whose digital conversion lags behind the reference time point, is corrected into the value of $\theta - \Delta\theta p$, which is reduced by the value corresponding to the lag; then, fixed/rotating coordinate transformation is performed.

In case of the five-phase electric motor, which is another polyphase electric motor, the embodiment performs digital conversion from five-phase (odd-phase) currents on the fixed coordinates of the electric motor, to phase-current data sequentially at intervals of $\Delta tp$, and transforms them into detection currents id and iq on the rotating coordinates by five-phase/two-phase transformation, which is the fixed/rotating coordinate transformation in case of a five-phase electric motor. This sequential digital conversion is performed in the order of the five phases. As shown in FIG. 5B, on the basis of the reference time point (required amount of phase shift is 0) of the v-phase digital conversion, which occurs at the center of the sequence of the digital conversion, the pole position $\theta$ of the t-phase current data, whose digital conversion leads ahead of the reference time point, is corrected into the value of $\theta + 2\Delta\theta p$, which is increased by $2\Delta\theta p$ corresponding to the lead; the pole position $\theta$ of the next u-phase current data is corrected into the value of $\theta + \Delta\theta p$, which is increased by $\Delta\theta p$ corresponding to the lead; the amount of phase shift for the next v-phase current data is rendered zero because it is the reference phase; the pole position $\theta$ of the next w-phase current data is corrected into the value of $\theta - \Delta\theta p$, which is reduced by the value $\Delta\theta p$ corresponding to the lag; the pole position $\theta$ of the next x-phase current data is corrected into the value of $\theta - 2\Delta\theta p$ that is reduced by the value $2\Delta\theta p$ corresponding to the lag; then, five-phase/two-phase transformation, that is, fixed/rotating coordinate transformation, is performed.

Second Embodiment

Figure 8A:
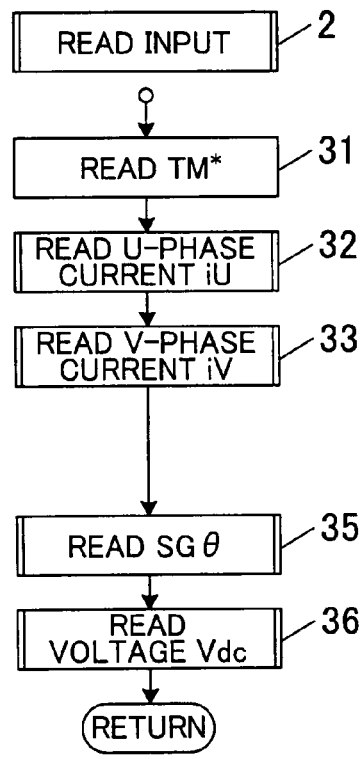
FIG. 8A is a flowchart showing the content of "read input" of a microcomputer MPU of a second embodiment of the present invention.
Figure 8B:
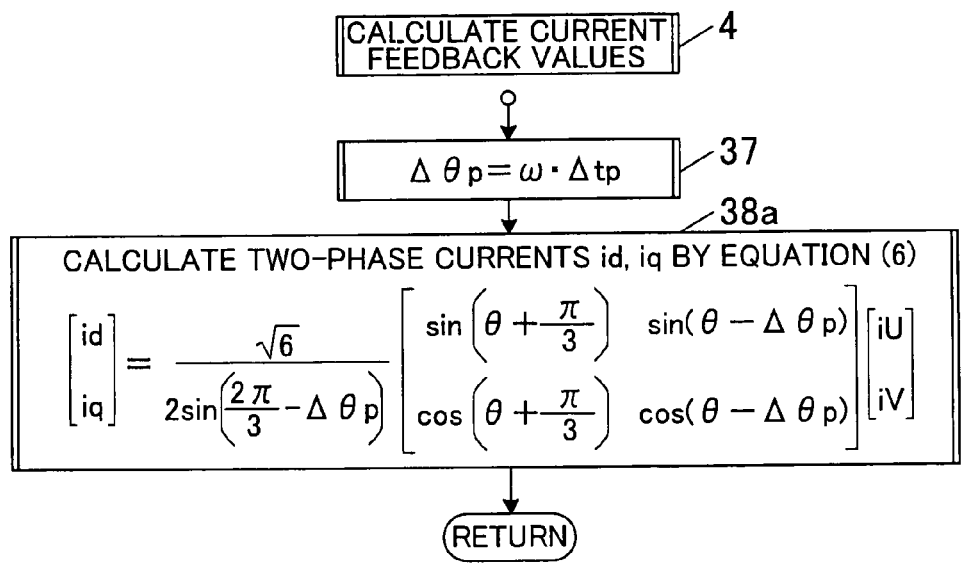
FIG. 8B is a flowchart showing the content of "calculate current feedback values"

A second embodiment of the present invention detects only two phase (U-phase and V-phase) currents, omitting the sensor 16, which is one of the three-phase current detection sensors 14 to 16 of the three-phase electric motor 10, and calculates the d-axis and q-axis feedback currents id and iq through the three-phase/two-phase transformation, namely fixed/rotating coordinate transformation, by the below equation (6). In other words, in "read input" (2), as shown in FIG. 8A, the micom MPU of the second embodiment reads in the current detection signal of the current sensor 14 through A/D conversion in "read U-phase current iU" (32), and then after $\Delta tp$, reads in the current detection signal of the current sensor 15 through A/D conversion in "read V-phase current iV" (33), but it does not read in a W-phase current. Corresponding to this, in "calculate current feedback values" (4), as shown in FIG. 8B, the micom MPU calculates the d-axis and q-axis feedback currents id and iq through the three-phase/two-phase transformation by the above equation (6), using two of the three-phase detection currents (38a). In order to increase the accuracy of the three-phase/two-phase transformation, the amplitude Kb of the currents id and iq, which are calculated in the equation (6), on the rotating coordinates, is represented by the equation (30) as:

$$Kb = (\sqrt{6})/[2\sin(2\pi/3 - \Delta\theta p)] \tag{30}$$

The reason for this is described as follows. When the currents id and iq on the rotating coordinates are ($\sqrt{2/3}$) and 0, as the equation (7) shows, in the case that the amount of pole position change $\Delta\theta p$ is 0, the two-phase currents iU and iV of the three-phase currents iU, iV, and iW on the fixed coordinates are represented by the equation (13).

$$\begin{bmatrix} iU \\ iV \end{bmatrix} = \begin{bmatrix} \cos\theta \\ \cos\left(\theta - \dfrac{2\pi}{3}\right) \end{bmatrix} \tag{13}$$

If the above-mentioned amount of pole position change $\Delta\theta p$ is not null, the two-phase currents iU and iV of the three-phase currents iU, iV, and iW are represented by the equation (14).

$$\begin{bmatrix} iU \\ iV \end{bmatrix} = \begin{bmatrix} \cos(\theta - \Delta\theta p) \\ \cos\left(\theta - \dfrac{2\pi}{3}\right) \end{bmatrix} \tag{14}$$

The three-phase/two-phase transformation equation in this case, with Kb denoting the amplitude of the currents id and iq on the rotating coordinates, is given by the equation (15).

$$\begin{bmatrix} id \\ iq \end{bmatrix} = Kb \cdot \begin{bmatrix} \sin(\theta + \frac{\pi}{3}) & \sin(\theta - \Delta\theta p) \\ \cos(\theta + \frac{\pi}{3}) & \cos(\theta - \Delta\theta p) \end{bmatrix} \begin{bmatrix} \cos(\theta - \Delta\theta p) \\ \cos\left(\theta - \frac{2\pi}{3}\right) \end{bmatrix} \quad (15)$$

By following this equation (15), and equating the calculated values to the values from the equation (7) as in the case that the amount of pole position change $\Delta\theta p$ is 0, the equation (16) is obtained. Calculating the amplitude Kb from the equation (16) leads to the equation (17).

$$\begin{bmatrix} iU \\ iV \end{bmatrix} = Kb \cdot \begin{bmatrix} \cos\left(\frac{2\pi}{3} - \Delta\theta p\right) \\ 0 \end{bmatrix} = \begin{bmatrix} \sqrt{\frac{3}{3}} \\ 0 \end{bmatrix} \quad (16)$$

$$Kb = \frac{\sqrt{6}}{2\sin\left(\frac{2\pi}{3} - \Delta\theta p\right)} \quad (17)$$

In other words, the amplitude Kb must be rendered to be $(\sqrt{6})/[2 \sin(2\pi/3 - \Delta\theta p)]$. By doing this, the current values id and iq on the rotating coordinates can be obtained exactly, even if the amount of pole position change $\Delta\theta p$ is not null.

The second embodiment performs digital conversion from the two-phase current detection signals iU and iV that the current sensors output, to the phase-current data at time intervals of $\Delta tp$, and, as shown in FIG. 9A, on the basis of the reference time point of the V-phase digital conversion, which occurs immediately after the central point of the sequence of the digital conversion, corrects the pole position $\theta$ of the phase current data iV of the digital conversion at the reference time point into the value that is reduced by the time interval $\Delta tp$, and then using the corrected value, performs the three-phase/two-phase transformation by the equation (6). On the basis of the reference time point of the U-phase digital conversion, which occurs immediately before the central point of the sequence of the digital conversion, the pole position $\theta$ of the phase current data iU of the digital conversion at the reference time point may be corrected into the value that is increased by the time interval $\Delta tp$, and the three-phase/two-phase transformation may be performed using the corrected value.

In case of the five-phase electric motor, which is another polyphase electric motor, the embodiment performs digital conversion from the four-phase current detection signals that the current sensors output to the phase-current data sequentially at intervals of $\Delta tp$. As shown in FIG. 9B, on the basis of the reference time point of the digital conversion (iv), which occurs immediately after the central point of the sequence of the digital conversion, comparing with the digital conversion (iu) immediately before the central point, corrects the pole position $\theta$ of the t-phase current data it, whose digital conversion leads ahead of the reference time point, into the value that is increased by the value $\Delta\theta p$ corresponding to the lead, and corrects the pole position $\theta$ of the v-phase and w-phase current data iv and iw, whose digital conversion lags behind the reference time point, into the values that are reduced by the values $\Delta\theta p$ and $2\Delta\theta p$ corresponding to the lags, and then, using the corrected values, performs five-phase/two-phase, fixed/rotating coordinate transformation.

If the reference time point is at the digital conversion (iu), which occurs immediately before the central point, the embodiment, comparing with the digital conversion (iv) immediately after, corrects the pole position $\theta$ of the t-phase and u-phase current data, whose digital conversion leads ahead of the reference time point, into the values that are increased by the values $2\Delta\theta p$ and $\Delta\theta p$ corresponding to the leads, and corrects the pole position $\theta$ of the w-phase current data iw, whose digital conversion lags behind the reference time point, into the value that is reduced by the value $\Delta\theta p$ corresponding to the lag, and then, using the corrected value, performs five-phase/two-phase, fixed/rotating coordinate transformation.

Other hardware and functions of the second embodiment are the same as those of the above-mentioned first embodiment.

Third Embodiment

The hardware of a third embodiment of the present invention is the same as that of the first embodiment, in which the current sensors 14 to 16 detect the U-phase, V-phase, and W-phase currents iU, iV, and iW of the electric motor 10. In the third embodiment, the current detection data iU, iV, and iW are transformed into the two-phase currents id and iq, using the three-phase/two-phase transformation equation (18) below, in which the pole position $\theta$ of the current detection data iU, iV, and iW is corrected by the amount of pole position change $\Delta td = \omega \cdot \Delta td = \omega \cdot \Delta ts + \omega \cdot \Delta tf$, which corresponds to the delay of the current detection signals, that is, the delay of A/D conversion to the actual phase currents, $\Delta td = \Delta ts + \Delta tf$, due to the detection delay $\Delta ts$ of the current sensors 14 to 16 and to the delay time (time constant) $\Delta tf$ of a filter circuit (CR filter) before digital conversion of the current detection signals.

$$\begin{bmatrix} id \\ iq \end{bmatrix} = \quad (18)$$

$$Ka \cdot \begin{bmatrix} \cos(\theta* + \Delta\theta p) & \cos\left(\theta* - \frac{2\pi}{3}\right) & \cos\left(\theta* - \Delta\theta p + \frac{2\pi}{3}\right) \\ -\sin(\theta* + \Delta\theta p) & -\sin\left(\theta*D - \frac{2\pi}{3}\right) & -\sin\left(\theta* - \Delta\theta p + \frac{2\pi}{3}\right) \end{bmatrix}$$

$$\begin{bmatrix} iU \\ iV \\ iW \end{bmatrix}$$

$$Ka = \frac{\sqrt{6}}{1 + 2\cos(2\Delta\theta p)}$$

$$\theta* = \theta - \Delta\theta d$$

$$\Delta\theta d = \Delta\theta s + \Delta\theta f$$

$$\Delta\theta s = \omega \cdot \Delta ts$$

$$\Delta\theta f = \omega \cdot \Delta tf$$

Figures 10A, 10B:
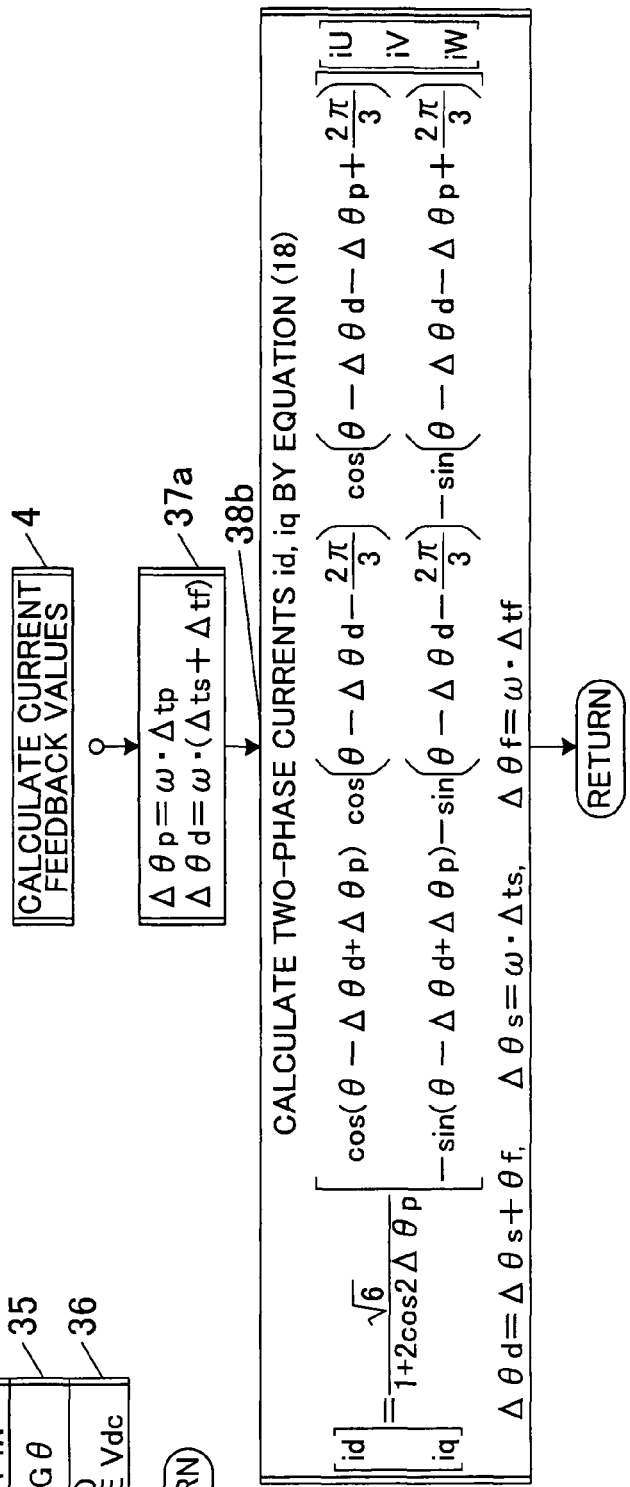
FIG. 10A is a flowchart showing the content of "read input" of a microcomputer MPU of a third embodiment of the present invention.
FIG. 10B is a flowchart showing the content of "calculate current feedback values"

Calculation of Two-Phase Currents id and iq According to a Third Aspect of the Present Invention In the same way as in the first embodiment, the micom MPU of the third embodiment, in "read input" (2) as shown in FIG. 10A, reads in the current detection signal of the current sensor 14 through A/D conversion in "read U-phase current iU" (32), then after $\Delta tp$, reads in the current detection signal of the current sensor 15 through A/D conversion in "read V-phase current iV" (33), and then after $\Delta tp$, reads in the current detection signal of the current sensor 16 through A/D conversion in "read W-phase current iW" (34). In "calculate current feedback values" (4), the inter-phase timing difference $\Delta tp$ of A/D conversion of the current detection signals and the delay Δtd=Δts+Δtf of the current detection signals, which is common among all phases, are converted to the amounts of pole position change Δθp and Δθd corresponding to their times, as shown in FIG. 10B (37a). Then, by the three-phase/two-phase transformation that uses the above equation (18), the current detection data iU, iV, and iW are transformed into the two-phase currents id and iq (38b). Other functions of the third embodiment are the same as those of the above-mentioned first embodiment.

Fourth Embodiment

A fourth embodiment of the present invention detects only two phase (U-phase and V-phase) currents, omitting the sensor 16, which is one of the three-phase current detection sensors 14 to 16 of the electric motor 10, and transforms the current detection data iU, iV, and iW into the two-phase currents id and iq, using the three-phase/two-phase transformation equation (19) below, in which the pole position θ is corrected by the amount corresponding to the detection delay Δts of the current sensors 14 and 15, and to the delay time Δtf of a filter circuit.

$$\begin{bmatrix} id \\ iq \end{bmatrix} = \tag{19}$$

$$\frac{\sqrt{6}}{2\sin\left(\frac{2\pi}{3} - \Delta\theta p\right)} \begin{bmatrix} \sin(\theta - \Delta\theta d + \frac{\pi}{6}) & \sin(\theta - \Delta\theta d - \Delta\theta p) \\ \cos(\theta - \Delta\theta d + \frac{\pi}{6}) & \cos(\theta - \Delta\theta d - \Delta\theta p) \end{bmatrix} \begin{bmatrix} iU \\ iV \end{bmatrix}$$

$$\Delta\theta d = \Delta\theta s + \Delta\theta f$$

$$\Delta\theta s = \omega \cdot \Delta ts$$

$$\Delta\theta f = \omega \cdot \Delta tf$$

Figure 11A:
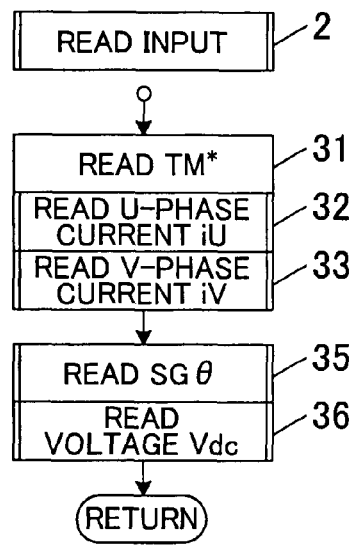
FIG. 11A is a flowchart showing the content of "read input" of a microcomputer MPU of a fourth embodiment of the present invention.
Figure 11B:
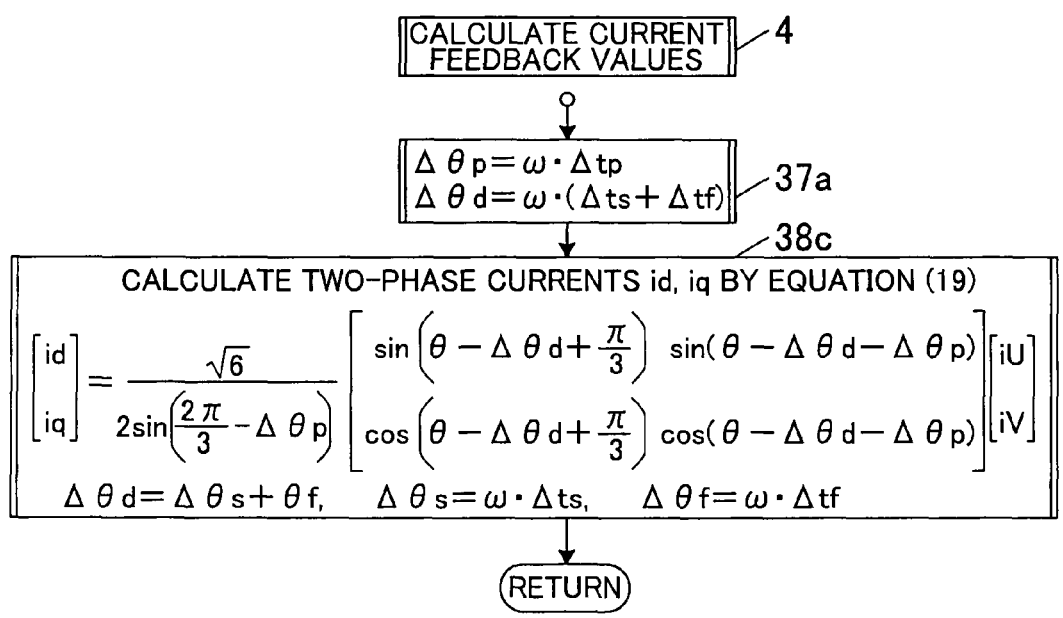
FIG. 11B is a flowchart showing the content of "calculate current feedback values".

Calculation of Two-Phase Currents id and iq According to a Fourth Aspect of the Present Invention Therefore, in "read input" (2), as shown in FIG. 11A, the micom MPU of the fourth embodiment reads in the current detection signal of the current sensor 14 through A/D conversion in "read U-phase current iU" (32), and then after Δtp, reads in the current detection signal of the current sensor 15 through A/D conversion in "read V-phase current iV" (33), but it does not read-in the W-phase current. In "calculate current feedback values" (4), the inter-phase timing difference Δtp of A/D conversion of the current detection signals and the delay Δtd=Δts+Δtf of the current detection signals, which is common among all phases, are converted to the amounts of pole position change Δθp and Δθd corresponding to their times, as shown in FIG. 11B (37a). Then, the d-axis and q-axis feedback currents id and iq are calculated using two of the three-phase detection currents, by the three-phase/two-phase transformation of the above equation 19 (38c). Other hardware and functions of the fourth embodiment are the same as those of the above-mentioned first embodiment.

According to an exemplary aspect of the invention, a feedback control method for detecting phase currents (for example iU, iV, and iW) of three or more phases on fixed coordinates of a polyphase electric motor (for example 10) with current sensors (for example 14 to 16) so as to be transformed into detection currents (for example id and iq) on rotating coordinates by fixed/rotating coordinate transformation (for example 31) and controlling the currents (for example iU, iV, and iW) supplied to the respective phases of the polyphase electric motor (for example 10) based on the detection currents (id and iq) on the rotating coordinates and target currents (for example id* and iq*) on rotating coordinates. The feedback control method including: performing digital conversion of odd-phase current detection signals (for example iU, iV, and iW) that are output from the current sensors (for example 14 to 16) into phase current data sequentially at a time interval of Δtp; and on a basis of a reference time point of digital conversion (for example iV) at a center of a sequence of the digital conversion, correcting a pole position θ of the phase current data (for example iU) whose digital conversion leads ahead of the reference time point into a value that is increased by the lead (for example Δθp), correcting the pole position θ of the phase current data (for example iW) whose digital conversion lags behind the reference time point into a value that is reduced by the lag (for example Δθp) (for example Equation 5 and FIG. 5), and using corrected values for the fixed/rotating coordinate transformation (for example Equation 5 below).

According to an exemplary aspect of the invention, a feedback control method for detecting three-phase currents (for example iU, iV, and iW) on fixed coordinates of a three-phase electric motor (for example 10) with current sensors (for example 14 to 16) so as to be transformed into detection currents (for example id and iq) on rotating coordinates by fixed/rotating coordinate transformation (for example 31) and controlling the currents (for example iU, iV, and iW) supplied to respective phases of the three-phase electric motor (for example 10) based on the detection currents (for example id and iq) on the rotating coordinates and target currents (for example id* and iq*) on the rotating coordinates. The feedback control method including: performing digital conversion of three-phase current detection signals (for example iU, iV, and iW) that are output from the current sensors (for example 14 to 16) into phase current data sequentially at a time interval of Δtp; and on a basis of a reference time point of digital conversion (for example iV) at a center of a sequence of the digital conversion, correcting a pole position θ of the phase current data (for example iU) whose digital conversion leads ahead of the reference time point into a value that is increased by the lead (for example Δθp), correcting the pole position θ of the phase current data (for example iW) whose digital conversion lags behind the reference time point into a value that is reduced by the lag (for example Δθp), and using corrected values for the fixed/rotating coordinate transformation (for example Equation 5 below).

According to an exemplary aspect of the invention, a feedback control method for detecting phase currents (for example iU, iV, and iW) of two or more phases on fixed coordinates of a polyphase electric motor (for example 10) with current sensors (for example 14 to 16) so as to be transformed into detection currents (for example id and iq) on rotating coordinates by fixed/rotating coordinate transformation (for example 31) and controlling the currents (for example iU, iV, and iW) supplied to respective phases of the polyphase electric motor (for example 10) based on the detection currents (for example id and iq) on the rotating coordinates and target currents (for example id* and iq*) on the rotating coordinates. The feedback control method including: performing digital conversion of the even-phase current detection signals (for example iU, iV, and iW) that are output from the current sensors (for example 14 to 16) into phase current data sequentially at a time interval of Δtp; and on a basis of a reference time point of the digital conversion immediately before or after a central point of a sequence of the digital conversion, by comparing either with the digital conversion (for example iU) immediately before the reference time point is at the central point or immediately after the reference time point is at the central point, correcting a pole position θ of the phase current data whose digital conversion leads ahead into a value that is increased by the lead, correcting the pole position θ of the phase current data (for example iV) whose digital conversion lags behind into a value that is reduced by the lag (for example Equation 6 and FIG. 9), and using corrected values for the fixed/rotating coordinate transformation (for example Equation 6 below).

According to an exemplary aspect of the invention, a feedback control method for detecting two-phase currents (for example iU, iV, and iW) on fixed coordinates of a three-phase electric motor (for example 10) with current sensors (for example 14 to 16) so as to be transformed into detection currents (for example id and iq) on rotating coordinates by fixed/rotating coordinate transformation (for example 31) and controlling the currents (for example iU, iV, and iW) supplied to respective phases of the three-phase electric motor (for example 10) based on the detection currents (id and iq) on the rotating coordinates and target currents (for example id* and iq*) on the rotating coordinates. The feedback control method including: performing digital conversion of two-phase current detection signals (for example iU and iV) that are output from the current sensors (for example 14 to 16) into phase current data at a time interval of Δtp; and on a basis of a reference time point of the digital conversion immediately before or after the central point of the sequence of the digital conversion, correcting the pole position θ of the phase current data (for example iV) of the digital conversion at the reference time point into a value that is reduced by an amount corresponding to the time interval Δtp as the reference time point is immediately after the central point (for example iV), correcting the pole position θ of the phase current data of the digital conversion at the reference time point into a value that is increased by an amount corresponding to the time interval Δtp as the reference time point is immediately before the central point (for example Equation 6 below and FIG. 9), and using corrected values for the fixed/rotating coordinate transformation (for example Equation 6).

The invention can be applied to a polyphase electric motor such as a three-phase or five-phase motor, or a three-phase electric motor. When applied to a three-phase electric motor for example, the pole position θ for three-phase currents (for example iU, iV, and iW) used for three-phase/two-phase transformation (for example 31) is corrected by the amount of pole position change Δθp during the time interval Δtp, as shown by the following equation (5). The equation (for example 5) is used for reading out detection currents of U-phase, V-phase, and W-phase in this order at a time interval of Δtp through digital conversion, correcting the U-phase current detection data iU to the value at the reading time of the V-phase data iV on the basis of the read timing of the V-phase, and also correcting the W-phase current detection data iW to the value at the reading time of the V-phase data iV. In other words, the equation (for example 5) is used to correct the current detection data of the U-phase, V-phase, and W-phase that have been read at times different by the amount corresponding to Δθp to the values at the same timing, and then perform the three-phase/two-phase transformation, which is the fixed/rotating coordinate transformation.

$$\begin{bmatrix} id \\ iq \end{bmatrix} = \frac{\sqrt{6}}{1 + 2\cos 2\Delta\theta p} \qquad (5)$$

$$\begin{bmatrix} \cos(\theta + \Delta\theta p) & \cos\left(\theta - \frac{2\pi}{3}\right) & \cos\left(\theta - \Delta\theta p + \frac{2\pi}{3}\right) \\ -\sin(\theta + \Delta\theta p) & -\sin\left(\theta - \frac{2\pi}{3}\right) & -\sin\left(\theta - \Delta\theta p + \frac{2\pi}{3}\right) \end{bmatrix} \begin{bmatrix} iU \\ iV \\ iW \end{bmatrix}$$

Therefore, even though there is the difference Δtp in read timing by digital conversion of detection currents of the U-phase, V-phase, and W-phase or two phases of them, the two-phase transformed values (for example id and iq) that are similar to the values read out at the same time are obtained. Thus, the accuracy of the feedback control, which uses the values as feedback values, of a three-phase electric motor is not impaired. Because a single A/D conversion unit can be used, a cost increase can be avoided. In case of application to a five-phase electric motor, five phase currents are detected and subjected to five-phase/two-phase transformation.

Furthermore, when applied to a three-phase electric motor for example, the pole position θ for two-phase currents (for example iU, and iV) used for three-phase/two-phase transformation (for example 31) is corrected by the amount of pole position change Δθp in the time interval Δtp, as shown by the following equation (for example 6). The equation (for example 6) is used for reading out detection currents of the U-phase and V-phase in this order at a time interval of Δtp through digital conversion, correcting the V-phase current detection data iV to the value at the reading time of the U-phase data iU on the basis of the read timing of the U-phase. In other words, the equation (for example 6) is used to correct the current detection data of the U-phase and V-phase that have been read at times different by the amount corresponding to Δθp to the values at the same timing, and then perform the fixed/rotating coordinate transformation.

$$\begin{bmatrix} id \\ iq \end{bmatrix} = \frac{\sqrt{6}}{2\sin\left(\frac{2\pi}{3} - \Delta\theta p\right)} \begin{bmatrix} \sin\left(\theta + \frac{\pi}{3}\right) & \sin(\theta - \Delta\theta p) \\ \cos\left(\theta + \frac{\pi}{3}\right) & \cos(\theta - \Delta\theta p) \end{bmatrix} \begin{bmatrix} iU \\ iV \end{bmatrix} \qquad (6)$$

Therefore, even though there is the difference Δtp in read timing by digital conversion of detection currents of the U-phase and V-phase, the rotating coordinate transformed values (for example id and iq) that are similar to the values read out at the same time are obtained. Thus, the accuracy of the feedback control, which uses the values as feedback values, of a three-phase electric motor is not impaired. Because a single A/D conversion unit can be used, a cost increase can be avoided. In case of application to a five-phase electric motor, four phase currents are detected and subjected to five-phase/two-phase transformation.

By this method, for example, even though there is a detection delay in the current sensor, the corresponding differences in timing of the current detection data iU, iV, and iW from the pole position θ are corrected; thus, the accuracy of the feedback control of the polyphase electric motor is improved.

By this method, even though a delay is generated in the detection current that is subjected to A/D conversion by filter processing, the corresponding differences in timing of the current detection data iU, iV, and iW from the pole position θ are corrected; thus, the accuracy of the feedback control of the polyphase electric motor is improved.

According to an exemplary aspect of the invention, a feedback control apparatus for an electric motor, including: a unit (for example 33 to 36, and 40 to 42) that generates target currents (for example id* and iq*) on rotating coordinates of a polyphase electric motor (for example 10); current sensors (for example 14 to 16) that detect phase currents (for example iU, iV, and iW) of three or more phases on fixed coordinates of the polyphase electric motor (for example 10); a unit (for example MPU: 32 to 34 in FIG. 4) that performs digital conversion of the odd-phase current detection signals (for example iU, iV, and iW) that are output from the current sensors (for example 14 to 16) into phase current data sequentially at a time interval of $\Delta tp$; a unit (for example 17 and 32) that detects the pole position $\theta$ of the polyphase electric motor (for example 10); a unit (for example 31) that, on a basis of a reference time point of digital conversion (for example iV) at the center of the sequence of the digital conversion, corrects the pole position $\theta$ of the phase current data (for example iU) whose digital conversion leads ahead of the reference time point into a value that is increased by a value (for example $\Delta\theta p$) corresponding to the lead, corrects the pole position $\theta$ of the phase current data (for example iW) whose digital conversion lags behind the reference time point into a value that is reduced by a value (for example $\Delta\theta p$) corresponding to the lag, and, using corrected values, transforms the phase current data (for example iU, iV, and iW) on the fixed coordinates into detection currents (for example id, iq) on rotating coordinates by fixed/rotating coordinate transformation; and a unit (for example 37, 38, 50, 20, and 19) that controls the currents (for example iU, iV, and iW) supplied to the respective phases of the polyphase electric motor, based on the detection currents (for example id and iq) on the rotating coordinates and the target currents (for example id* and iq*).

According to an exemplary aspect of the invention, a feedback control apparatus for an electric motor, includes a unit (for example 33 to 36, and 40 to 42) that generates target currents (for example id* and iq*) on rotating coordinates of a three-phase electric motor (for example 10); current sensors (for example 14 to 16) that detect three-phase currents (for example iU, iV, and iW) on fixed coordinates of the three-phase electric motor (10); a unit (for example MPU: 32 to 34 in FIG. 4) that performs digital conversion of the three-phase current detection signals (for example iU, iV, and iW) that are output from the current sensors (for example 14 to 16) into phase current data sequentially at a time interval of $\Delta tp$; a unit (for example 17 and 32) that detects the pole position $\theta$ of the three-phase electric motor (for example 10); a unit (for example 31) that, on a basis of a reference time point of digital conversion (for example iV) at the center of the sequence of the digital conversion, corrects the pole position $\theta$ of the phase current data (for example iU) whose digital conversion leads ahead of the reference time point into a value that is increased by a value (for example $\Delta\theta p$) corresponding to the lead, corrects the pole position $\theta$ of the phase current data (for example iW) whose digital conversion lags behind the reference time point into a value that is reduced by a value (for example $\Delta\theta p$) corresponding to the lag, and, using corrected values, transforms the phase current data (for example iU, iV, and iW) on the fixed coordinates into detection currents (for example id, iq) on rotating coordinates by fixed/rotating coordinate transformation; and a unit (for example 37, 38, 50, 20, and 19) that controls the currents (for example iU, iV, and iW) supplied to the respective phases of the three-phase electric motor, based on the detection currents (for example id and iq) on the rotating coordinates and the target currents (for example id* and iq*).

According to an exemplary aspect of the invention, a feedback control apparatus for an electric motor includes a unit (for example 33 to 36, and 40 to 42) that generates target currents (for example id* and iq*) on rotating coordinates of a polyphase electric motor (for example 10); current sensors (for example 14 to 16) that detect phase currents (for example iU, iV, and iW) of two or more phases on fixed coordinates of the polyphase electric motor (for example 10); a unit (for example MPU: 32 to 34 in FIG. 4) that performs digital conversion of the even-phase current detection signals (for example iU, iV, and iW) that are output from the current sensors (for example 14 to 16) into phase current data sequentially at a time interval of $\Delta tp$; a unit (for example 17 and 32) that detects the pole position $\theta$ of the polyphase electric motor (for example 10); a unit (for example 31) that, on a basis of a reference time point of digital conversion immediately before or after the central point of the sequence of the digital conversion, by comparing either with the digital conversion (for example iU) immediately before as the reference time point is immediately after the central point, or with the digital conversion immediately after as the reference time point is immediately before the central point, corrects the pole position $\theta$ of the phase current data whose digital conversion leads ahead into a value that is increased by the lead, corrects the pole position $\theta$ of the phase current data (for example iV) whose digital conversion lags behind into a value that is reduced by a value corresponding to the lag (for example Equation 6 and FIG. 9), and, using corrected values, transforms the phase current data (for example iU and iV) on the fixed coordinates into detection currents (for example id, iq) on rotating coordinates by fixed/rotating coordinate transformation; and a unit (for example 37, 38, 50, 20, and 19) that controls the currents (for example iU, iV, and iW) supplied to the respective phases of the polyphase electric motor, based on the detection currents (for example id and iq) on the rotating coordinates and the target currents (for example id* and iq*).

According to an exemplary aspect of the invention, a feedback control apparatus for an electric motor includes a unit (for example 33 to 36, and 40 to 42) that generates target currents (for example id* and iq*) on rotating coordinates of a three-phase electric motor (for example 10); current sensors (for example 14 to 16) that detect two-phase currents (for example iU, iV, and iW) on fixed coordinates of the three-phase electric motor (for example 10); a unit (for example MPU: 32 to 34 in FIG. 4) that performs digital conversion of the two-phase current detection signals (for example iU, iV, and iW) that are output from the current sensors (for example 14 to 16) into phase current data sequentially at a time interval of $\Delta tp$; a unit (for example 17 and 32) that detects the pole position $\theta$ of the three-phase electric motor (for example 10); a unit (for example 31) that, on a basis of a reference time point of digital conversion immediately before or after the central point of the sequence of the digital conversion, corrects the pole position $\theta$ of the phase current data (for example iV) of the digital conversion at the reference time point into a value that is reduced by an amount corresponding to the time interval $\Delta tp$ as the reference time point is immediately after the central point (for example iV), corrects the pole position $\theta$ of the phase current data of the digital conversion at the reference time point into a value that is increased by an amount corresponding to the time interval $\Delta tp$ as the reference time point is immediately before the central point (for example Equation 6 and FIG. 9), and, using corrected values, transforms the phase current data (for example iU and iV) on the fixed coordinates into the detection currents (for example id, iq) on rotating coordinates by fixed/rotating coordinate transformation; and a unit (for example 37, 38, 50, 20, and 19)

that controls the currents (for example iU, iV, and iW) supplied to the respective phases of the three-phase electric motor, based on the detection currents (id and iq) on the rotating coordinates and the target currents (for example id* and iq*).

The motor currents (for example id and iq) that generate the same torque vary (for example, a dotted-line curve, that is, an equal torque curve in FIG. 6). Therefore, if the currents (minimum current values) that provide a minimum power consumption are selected from the variety and supplied to the electric motor, the motor drive efficiency is high. In other words, the power usage effectiveness is high. The curve that connects the points (maximum efficiency points), each of which represents a minimum current value on an equal torque curve of a target torque, is the "high-efficiency torque curve". If the motor is energized using the current values (for example id and iq) at the position (for example point) of a given target torque (for example T*) as the target currents, the power usage effectiveness of motor drive is high. Because the present embodiment determines the target currents (for example id* and iq*) based on the "high-efficiency torque curve", the power usage effectiveness of motor drive is high.

With this apparatus, because the magnetic field of a permanent magnet of a rotor is weakened by the field weakening current (for example Δid), the back induced voltage by the rotation of the rotor is reduced, and thus the output torque reduction at high speed is suppressed, enabling high-speed drive of an electric motor.

What is claimed is:

1. A feedback control method for detecting phase currents of three or more phases on fixed coordinates of a polyphase electric motor with current sensors so as to be transformed into detection currents on rotating coordinates by fixed/rotating coordinate transformation and controlling the currents supplied to respective phases of the polyphase electric motor based on the detection currents on the rotating coordinates and target currents on the rotating coordinates, the feedback control method comprising:
performing digital conversion of odd-phase current detection signals that are output from the current sensors into phase current data sequentially at a time interval; and
on a basis of a reference time point of digital conversion at a center of a sequence of the digital conversion, correcting a pole position of the phase current data whose digital conversion leads ahead of the reference time point into a value that is increased by the lead, correcting the pole position of the phase current data whose digital conversion lags behind the reference time point into a value that is reduced by the lag, and using corrected values for the fixed/rotating coordinate transformation.

2. The feedback control method for the electric motor according to claim 1, wherein the method corrects the pole position for phase currents on the fixed coordinates used for the fixed/rotating coordinate transformation, in a direction that reduces the delay of the detection currents, which is obtained by the fixed/rotating coordinate transformation, on rotating coordinates, from the phase currents on the fixed coordinates, by an amount of pole position change during a delay time of the change of the phase current detection signals of the current sensors from the change of phase currents on the fixed coordinates.

3. The feedback control method for the electric motor according to claim 1, wherein the method corrects the pole position for phase currents on the fixed coordinates used for the fixed/rotating coordinate transformation, in a direction that reduces the delay of the detection currents, which is obtained by the fixed/rotating coordinate transformation, on rotating coordinates, from the phase currents on the fixed coordinates, by an amount of pole position change during a delay time by filter processing applied to the phase current detection signals before the digital conversion.

4. The feedback control method for the electric motor according to claim 1, wherein the method corrects the amplitudes of the detection currents on the rotating coordinates of the fixed/rotating coordinate transformation, corresponding to amounts of correction to the pole position for the phase currents on the fixed coordinates.

5. A feedback control method for detecting three-phase currents on fixed coordinates of a three-phase electric motor with current sensors so as to be transformed into detection currents on rotating coordinates by fixed/rotating coordinate transformation and controlling the currents supplied to respective phases of the three-phase electric motor based on the detection currents on the rotating coordinates and target currents on the rotating coordinates, the feedback control method comprising:
performing digital conversion of three-phase current detection signals that are output from the current sensors into phase current data sequentially at a time interval; and
on a basis of a reference time point of digital conversion at a center of a sequence of the digital conversion, correcting a pole position of the phase current data whose digital conversion leads ahead of the reference time point into a value that is increased by the lead, correcting the pole position of the phase current data whose digital conversion lags behind the reference time point into a value that is reduced by the lag, and using corrected values for the fixed/rotating coordinate transformation.

6. The feedback control method for the electric motor according to claim 5, wherein the method corrects the pole position for phase currents on the fixed coordinates used for the fixed/rotating coordinate transformation, in a direction that reduces the delay of the detection currents, which is obtained by the fixed/rotating coordinate transformation, on rotating coordinates, from the phase currents on the fixed coordinates, by an amount of pole position change during a delay time of the change of the phase current detection signals of the current sensors from the change of phase currents on the fixed coordinates.

7. The feedback control method for the electric motor according to claim 5, wherein the method corrects the pole position for phase currents on the fixed coordinates used for the fixed/rotating coordinate transformation, in a direction that reduces the delay of the detection currents, which is obtained by the fixed/rotating coordinate transformation, on rotating coordinates, from the phase currents on the fixed coordinates, by an amount of pole position change during a delay time by filter processing applied to the phase current detection signals before the digital conversion.

8. The feedback control method for the electric motor according to claim 5, wherein the method corrects the amplitudes of the detection currents on the rotating coordinates of the fixed/rotating coordinate transformation, corresponding to amounts of correction to the pole position for the phase currents on the fixed coordinates.

9. A feedback control method for detecting phase currents of two or more phases on fixed coordinates of a polyphase electric motor with current sensors so as to be transformed into detection currents on rotating coordinates by fixed/rotating coordinate transformation and controlling the currents supplied to respective phases of the polyphase electric motor based on the detection currents on the rotating coordinates and target currents on the rotating coordinates, the feedback control method comprising:

performing digital conversion of even-phase current detection signals that are output from the current sensors into phase current data sequentially at a time interval; and on a basis of a reference time point of the digital conversion immediately before or after a central point of a sequence of the digital conversion, by comparing either with the digital conversion immediately before the reference time point is at the central point or immediately after the reference time point is at the central point, correcting a pole position of the phase current data whose digital conversion leads ahead into a value that is increased by the lead, correcting the pole position of the phase current data whose digital conversion lags behind into a value that is reduced by the lag, and using corrected values for the fixed/rotating coordinate transformation.

10. The feedback control method for the electric motor according to claim 9, wherein the method corrects the pole position for phase currents on the fixed coordinates used for the fixed/rotating coordinate transformation, in a direction that reduces the delay of the detection currents, which is obtained by the fixed/rotating coordinate transformation, on rotating coordinates, from the phase currents on the fixed coordinates, by an amount of pole position change during a delay time of the change of the phase current detection signals of the current sensors from the change of phase currents on the fixed coordinates.

11. The feedback control method for the electric motor according to claim 9, wherein the method corrects the pole position for phase currents on the fixed coordinates used for the fixed/rotating coordinate transformation, in a direction that reduces the delay of the detection currents, which is obtained by the fixed/rotating coordinate transformation, on rotating coordinates, from the phase currents on the fixed coordinates, by an amount of pole position change during a delay time by filter processing applied to the phase current detection signals before the digital conversion.

12. The feedback control method for the electric motor according to claim 9, wherein the method corrects the amplitudes of the detection currents on the rotating coordinates of the fixed/rotating coordinate transformation, corresponding to amounts of correction to the pole position for the phase currents on the fixed coordinates.

13. A feedback control method for detecting two-phase currents on fixed coordinates of a three-phase electric motor with current sensors so as to be transformed into detection currents on rotating coordinates by fixed/rotating coordinate transformation and controlling the currents supplied to respective phases of the three-phase electric motor based on the detection currents on the rotating coordinates and target currents on the rotating coordinates, the feedback control method comprising:

performing digital conversion of two-phase current detection signals that are output from the current sensors into phase current data at a time interval; and on a basis of a reference time point of the digital conversion immediately before or after a central point of a sequence of the digital conversion, correcting the pole position of the phase current data of the digital conversion at the reference time point into a value that is reduced by an amount corresponding to the time interval as the reference time point is immediately after the central point, correcting the pole position of the phase current data of the digital conversion at the reference time point into a value that is increased by an amount corresponding to the time interval as the reference time point is immediately before the central point, and using corrected values for the fixed/rotating coordinate transformation.

14. The feedback control method for the electric motor according to claim 13, wherein the method corrects the pole position for phase currents on the fixed coordinates used for the fixed/rotating coordinate transformation, in a direction that reduces the delay of the detection currents, which is obtained by the fixed/rotating coordinate transformation, on rotating coordinates, from the phase currents on the fixed coordinates, by an amount of pole position change during a delay time of the change of the phase current detection signals of the current sensors from the change of phase currents on the fixed coordinates.

15. The feedback control method for the electric motor according to claim 13, wherein the method corrects the pole position for phase currents on the fixed coordinates used for the fixed/rotating coordinate transformation, in a direction that reduces the delay of the detection currents, which is obtained by the fixed/rotating coordinate transformation, on rotating coordinates, from the phase currents on the fixed coordinates, by an amount of pole position change during a delay time by filter processing applied to the phase current detection signals before the digital conversion.

16. The feedback control method for the electric motor according to claim 13, wherein the method corrects the amplitudes of the detection currents on the rotating coordinates of the fixed/rotating coordinate transformation, corresponding to amounts of correction to the pole position for the phase currents on the fixed coordinates.

17. A feedback control apparatus, comprising:

current sensors that detect phase currents of three or more phases on fixed coordinates of a polyphase electric motor; and a controller that:
generates target currents on rotating coordinates of the polyphase electric motor;
performs digital conversion of odd-phase current detection signals that are output from the current sensors into phase current data sequentially at a time interval;
detects a pole position of the polyphase electric motor;
on a basis of a reference time point of digital conversion at a center of a sequence of the digital conversion, corrects the pole position of the phase current data whose digital conversion leads ahead of the reference time point into a value that is increased by the lead, corrects the pole position of the phase current data whose digital conversion lags behind the reference time point into a value that is reduced by the lag, and, using corrected values, transforms the phase current data on the fixed coordinates into detection currents on rotating coordinates by fixed/rotating coordinate transformation; and
controls the currents supplied to the respective phases of the polyphase electric motor, based on the detection currents on the rotating coordinates and the target currents.

18. The feedback control apparatus according claim 17, wherein the controller that generates the target currents includes high-efficiency torque curve tables that contain each target current that generates a target torque at each rotational velocity of the electric motor with a minimum power consumption, and reads out target currents for the given target torque from the high-efficiency torque curve tables.

19. The feedback control apparatus according to claim 18, wherein the controller that generates the target currents derives a field weakening current based on a power supply voltage fed to the electric motor and target voltages corresponding to the target currents, and corrects the target current into a value obtained by subtracting a value equivalent to the field weakening current from the target current, which is read out from the high-efficiency torque curve tables.

20. The feedback control apparatus according to claim 17, wherein the controller corrects the pole position for the phase currents on the fixed coordinates used for the fixed/rotating coordinate transformation, in a direction that reduces the delay of the detection currents, which is obtained by the fixed/rotating coordinate transformation, on the rotating coordinates, from the phase currents on the fixed coordinates, by an amount of pole position change during a delay time of the change of the phase current detection signals of the current sensors from the change of the phase currents on the fixed coordinates.

21. The feedback control apparatus according to claim 17, wherein the controller corrects the pole position for the phase currents on the fixed coordinates used for the fixed/rotating coordinate transformation, in a direction that reduces the delay of the detection currents, which is obtained by fixed/rotating coordinate transformation, on the rotating coordinates, from the phase currents on the fixed coordinates, by an amount of pole position change during a delay time by filter processing applied to the phase current detection signals before the digital conversion.

22. The feedback control apparatus according to claim 17, wherein the controller corrects the amplitudes of the detection currents on the rotating coordinates of the fixed/rotating coordinate transformation, corresponding to each amount of correction to the pole position for the phase currents on the fixed coordinates.

23. The feedback control apparatus according to claim 17, wherein the electric motor is an in-vehicle electric motor that is mounted in a vehicle and performs rotary drive of wheels of the vehicle.

24. A feedback control apparatus, comprising:
current sensors that detect three-phase currents on fixed coordinates of a three-phase electric motor; and
a controller that:
generates target currents on rotating coordinates of the three-phase electric motor;
performs digital conversion of three-phase current detection signals that are output from the current sensors into phase current data sequentially at a time interval;
detects a pole position of the three-phase electric motor;
on a basis of a reference time point of digital conversion at a center of a sequence of the digital conversion, corrects the pole position of the phase current data whose digital conversion leads ahead of the reference time point into a value that is increased by the lead, corrects the pole position of the phase current data whose digital conversion lags behind the reference time point into a value that is reduced by the lag, and, using corrected values, transforms the phase current data on the fixed coordinates into detection currents on rotating coordinates by fixed/rotating coordinate transformation; and
controls the currents supplied to the respective phases of the three-phase electric motor, based on the detection currents on the rotating coordinates and the target currents.

25. The feedback control apparatus according to claim 24, wherein the controller that generates the target currents includes high-efficiency torque curve tables that contain each target current that generates a target torque at each rotational velocity of the electric motor with a minimum power consumption, and reads out target currents for the given target torque from the high-efficiency torque curve tables.

26. The feedback control apparatus according to claim 25, wherein the controller that generates the target currents derives a field weakening current based on a power supply voltage fed to the electric motor and target voltages corresponding to the target currents, and corrects the target current into a value obtained by subtracting a value equivalent to the field weakening current from the target current, which is read out from the high-efficiency torque curve tables.

27. The feedback control apparatus according to claim 24, wherein the controller corrects the pole position for the phase currents on the fixed coordinates used for the fixed/rotating coordinate transformation, in a direction that reduces the delay of the detection currents, which is obtained by the fixed/rotating coordinate transformation, on the rotating coordinates, from the phase currents on the fixed coordinates, by an amount of pole position change during a delay time of the change of the phase current detection signals of the current sensors from the change of the phase currents on the fixed coordinates.

28. The feedback control apparatus according to claim 24, wherein the controller corrects the pole position for the phase currents on the fixed coordinates used for the fixed/rotating coordinate transformation, in a direction that reduces the delay of the detection currents, which is obtained by the fixed/rotating coordinate transformation, on the rotating coordinates, from the phase currents on the fixed coordinates, by an amount of pole position change during a delay time by filter processing applied to the phase current detection signals before the digital conversion.

29. The feedback control apparatus according to claim 24, wherein the controller corrects the amplitudes of the detection currents on the rotating coordinates of the fixed/rotating coordinate transformation, corresponding to each amount of correction to the pole position for the phase currents on the fixed coordinates.

30. The feedback control apparatus according to claim 24, wherein the electric motor is an in-vehicle electric motor that is mounted in a vehicle and performs rotary drive of wheels of the vehicle.

31. A feedback control apparatus, comprising:
current sensors that detect phase currents of two or more phases on fixed coordinates of a polyphase electric motor; and
a controller that:
generates target currents on rotating coordinates of the polyphase electric motor;
performs digital conversion of even-phase current detection signals that are output from the current sensors into phase current data sequentially at a time interval;
detects a pole position of the polyphase electric motor;
on a basis of a reference time point of the digital conversion immediately before or after a central point of a sequence of the digital conversion, by comparing either with the digital conversion immediately before the reference time point is at the central point or immediately after the reference time point is at the central point, corrects the pole position of the phase current data whose digital conversion leads ahead into a value that is increased by the lead, corrects the pole position of the phase current data whose digital conversion lags behind into a value that is reduced by the lag, and, using corrected values, transforms the phase current data on the fixed coordinates into detection currents on rotating coordinates by fixed/rotating coordinate transformation; and controls the currents supplied to the respective phases of the polyphase electric motor, based on the detection currents on the rotating coordinates and the target currents.

32. The feedback control apparatus according to claim 31, wherein the controller that generates the target currents includes high-efficiency torque curve tables that contain each target current that generates a target torque at each rotational velocity of the electric motor with a minimum power consumption, and reads out target currents for the given target torque from the high-efficiency torque curve tables.

33. The feedback control apparatus according to claim 32, wherein the controller that generates the target currents derives a field weakening current based on a power supply voltage fed to the electric motor and target voltages corresponding to the target currents, and corrects the target current into a value obtained by subtracting a value equivalent to the field weakening current from the target current, which is read out from the high-efficiency torque curve tables.

34. The feedback control apparatus according to claim 31, wherein the controller corrects the pole position for the phase currents on the fixed coordinates used for the fixed/rotating coordinate transformation, in a direction that reduces the delay of the detection currents, which is obtained by the fixed/rotating coordinate transformation, on the rotating coordinates, from the phase currents on the fixed coordinates, by an amount of pole position change during a delay time of the change of the phase current detection signals of the current sensors from the change of the phase currents on the fixed coordinates.

35. The feedback control apparatus according to claim 31, wherein the controller corrects the pole position for the phase currents on the fixed coordinates used for the fixed/rotating coordinate transformation, in a direction that reduces the delay of the detection currents, which is obtained by the fixed/rotating coordinate transformation, on the rotating coordinates, from the phase currents on the fixed coordinates, by an amount of pole position change during a delay time by filter processing applied to the phase current detection signals before the digital conversion.

36. The feedback control apparatus according to claim 31, wherein the controller corrects the amplitudes of the detection currents on the rotating coordinates of the fixed/rotating coordinate transformation, corresponding to each amount of correction to the pole position for the phase currents on the fixed coordinates.

37. The feedback control apparatus according to claim 31, wherein the electric motor is an in-vehicle electric motor that is mounted in a vehicle and performs rotary drive of wheels of the vehicle.

38. A feedback control apparatus, comprising:
current sensors that detect two-phase currents on fixed coordinates of a three-phase electric motor; and
a controller that:
generates target currents on rotating coordinates of the three-phase electric motor;
performs digital conversion of two-phase current detection signals that are output from the current sensors into phase current data at a time interval;
detects a pole position of the three-phase electric motor;
on a basis of a reference time point of the digital conversion immediately before or after a central point of a sequence of the digital conversion, corrects the pole position of the phase current data of the digital conversion at the reference time point into a value that is reduced by an amount corresponding to the time interval as the reference time point is immediately after the central point, corrects the pole position of the phase current data of the digital conversion at the reference time point into a value that is increased by an amount corresponding to the time interval as the reference time point is immediately before the central point, and, using corrected values, transforms the phase current data on the fixed coordinates into detection currents on rotating coordinates by fixed/rotating coordinate transformation; and
controls the currents supplied to the respective phases of the three-phase electric motor, based on the detection currents on the rotating coordinates and the target currents.

39. The feedback control apparatus according to claim 38, wherein the controller that generates the target currents includes high-efficiency torque curve tables that contain each target current that generates a target torque at each rotational velocity of the electric motor with a minimum power consumption, and reads out target currents for the given target torque from the high-efficiency torque curve tables.

40. The feedback control apparatus according to claim 39, wherein the controller that generates the target currents derives a field weakening current based on a power supply voltage fed to the electric motor and target voltages corresponding to the target currents, and corrects the target current into a value obtained by subtracting a value equivalent to the field weakening current from the target current, which is read out from the high-efficiency torque curve tables.

41. The feedback control apparatus according to claim 38, wherein the controller corrects the pole position for the phase currents on the fixed coordinates used for the fixed/rotating coordinate transformation, in a direction that reduces the delay of the detection currents, which is obtained by the fixed/rotating coordinate transformation, on the rotating coordinates, from the phase currents on the fixed coordinates, by an amount of pole position change during a delay time of the change of the phase current detection signals of the current sensors from the change of the phase currents on the fixed coordinates.

42. The feedback control apparatus according to claim 38, wherein the controller corrects the pole position for the phase currents on the fixed coordinates used for the fixed/rotating coordinate transformation, in a direction that reduces the delay of the detection currents, which is obtained by the fixed/rotating coordinate transformation, on the rotating coordinates, from the phase currents on the fixed coordinates, by an amount of pole position change during a delay time by filter processing applied to the phase current detection signals before the digital conversion.

43. The feedback control apparatus according to claim 38, wherein the controller corrects the amplitudes of the detection currents on the rotating coordinates of the fixed/rotating coordinate transformation, corresponding to each amount of correction to the pole position for the phase currents on the fixed coordinates.

44. The feedback control apparatus according to claim 38, wherein the electric motor is an in-vehicle electric motor that is mounted in a vehicle and performs rotary drive of wheels of the vehicle.

45. A feedback control method for detecting multiple phase currents of three or more phases on fixed coordinates of a polyphase electric motor with current sensors so as to be transformed into detection currents on rotating coordinates by fixed/rotating coordinate transformation and controlling the currents supplied to respective phases of the polyphase electric motor based on the detection currents on the rotating coordinates and target currents on the rotating coordinates, the feedback control method comprising:

performing digital conversion of multiple phase current detection signals that are output from the current sensors into phase current data sequentially at a time interval; and on a basis of a reference time point of digital conversion at a center of a sequence of the digital conversion or immediately before or after the central point of the sequence of the digital conversion, correcting a pole position of the phase current data whose digital conversion leads ahead of the reference time point into a value that is increased by the lead or whose digital conversion lags behind the reference time point into a value that is reduced by the lag, and using corrected values for the fixed/rotating coordinate transformation.

* * * * *